US009844791B2

(12) United States Patent
Miller et al.

(10) Patent No.: US 9,844,791 B2
(45) Date of Patent: Dec. 19, 2017

(54) MICRONOZZLE ATOMIZERS AND METHODS OF MANUFACTURE AND USE

(71) Applicant: Oregon State University, Corvallis, OR (US)

(72) Inventors: Richard Todd Miller, Corvallis, OR (US); Neill Thornton, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 14/434,389

(22) PCT Filed: Oct. 8, 2013

(86) PCT No.: PCT/US2013/063889
§ 371 (c)(1),
(2) Date: Apr. 8, 2015

(87) PCT Pub. No.: WO2014/058885
PCT Pub. Date: Apr. 17, 2014

(65) Prior Publication Data
US 2015/0266040 A1    Sep. 24, 2015

Related U.S. Application Data

(60) Provisional application No. 61/711,128, filed on Oct. 8, 2012.

(51) Int. Cl.
*B01F 5/06* (2006.01)
*B05B 7/04* (2006.01)
(Continued)

(52) U.S. Cl.
CPC ........ *B05B 7/0416* (2013.01); *B01F 13/0059* (2013.01); *B01F 13/0066* (2013.01);
(Continued)

(58) Field of Classification Search
CPC .............. B01F 13/0059; B01F 13/0062; B01F 13/0064; B01F 13/0066; B01F 5/0641;
(Continued)

(56) References Cited

U.S. PATENT DOCUMENTS 2,286,591 A * 6/1942 Van Triest ............... B23K 7/06
148/197
3,615,054 A * 10/1971 La Botz .................... F02K 9/52
239/553.5

(Continued)

FOREIGN PATENT DOCUMENTS

JP    2007-502979    2/2007
JP    2009-114953    5/2009
(Continued)

OTHER PUBLICATIONS

Ehrfeld et al., "Characterization of Mixing in Micromixers by a Test Reaction: Single Mixing Units and Mixer Arrays," *Ind. Eng. Chem. Res.* 38:1075-1082, Jan. 23, 1999.
(Continued)

*Primary Examiner* — Alexander Valvis
(74) *Attorney, Agent, or Firm* — Klarquist Sparkman, LLP

(57) ABSTRACT

A micronozzle device can include at least one layer having a plurality of nozzle exits for delivering a mixture of a first fluid and a second fluid, at least one first-fluid header layer having a plurality of first microchannels for receiving the first fluid, at least one first-fluid via layer adjacent the at least one first-fluid header layer to receive the first fluid and direct it to respective ones of the plurality of nozzle exits, at least one second-fluid header layer having a plurality of second microchannels for receiving the second fluid, at least one second-fluid via layer adjacent the at least one second-fluid header layer to receive the second fluid and direct it respective ones of the plurality of nozzle exits, and a plurality of
(Continued)

first curtain-gas nozzles located at a first side of the micronozzle device and a plurality of second curtain-gas nozzles located at a second side of the micronozzle device.

17 Claims, 48 Drawing Sheets

(51) Int. Cl.
  *B01F 13/00* (2006.01)
  *B01J 19/00* (2006.01)
  *B05B 1/14* (2006.01)
(52) U.S. Cl.
  CPC ............ *B01J 19/0093* (2013.01); *B05B 1/14* (2013.01); *B01J 2219/00783* (2013.01); *B01J 2219/00889* (2013.01)
(58) Field of Classification Search
  CPC ............ B01F 5/0604; B01J 2219/0036; B01J 2219/00783; B01J 2219/00889; B01J 2219/0093; F02M 61/186; F02M 19/0228
  USPC ............ 239/553.5, 555, 462, 553, 575, 590, 239/DIG. 23
  See application file for complete search history.

(56) References Cited

U.S. PATENT DOCUMENTS

| | | | |
|---|---|---|---|
| 3,914,348 A | 10/1975 | Kors et al. | |
| 4,081,136 A * | 3/1978 | Addoms | F02K 9/52 239/127.1 |
| 5,387,398 A * | 2/1995 | Mueggenburg | B01J 3/008 239/555 |
| 5,534,328 A * | 7/1996 | Ashmead | B01F 5/0604 210/150 |
| 6,375,099 B1 * | 4/2002 | McGuffey | B05C 5/0254 239/124 |
| 6,739,576 B2 * | 5/2004 | O'Connor | F15C 5/00 137/827 |
| 7,093,776 B2 | 8/2006 | Schneider | |
| 7,241,423 B2 * | 7/2007 | Golbig | B01F 5/0604 422/129 |
| 7,347,617 B2 | 3/2008 | Pugia et al. | |
| 2009/0092526 A1 | 4/2009 | Miller | |
| 2009/0201761 A1 | 8/2009 | Matsuno et al. | |
| 2012/0140588 A1 | 6/2012 | Pfeffer et al. | |

FOREIGN PATENT DOCUMENTS

| | | |
|---|---|---|
| JP | 2009-247939 | 10/2009 |
| KR | 10-2009-0028835 | 3/2009 |
| WO | WO 2011-127377 | 10/2011 |

OTHER PUBLICATIONS

Nakamura et al., "Preparation of CdSe nanocrystals in a microflow-reactor," *Chem. Commun.* 2844-2845, 2002.

Sandlin et al., "Microfluidic Electrophoresis Chip Coupled to Microdialysis for in Vivo Monitoring of Amino Acid Neurotrasmitters," *Anal. Chem.* 77:7702-7708, Oct. 25, 2005.

International Search Report and Written Opinion of the International Searching Authority from international application No. PCT/US2011/031732 dated Feb. 8, 2012.

* cited by examiner

| Kerosene: density = 800 kg/m^3, viscosity = 1.152x10-3 Pa*s | | | | | |
|---|---|---|---|---|---|
| Length (um) | Width (um) | Depth (um) | Velocity (m/s) | Delta P (Pa) | Delta P (psi) |
| 500 | 25 | 25 | 1 | 2.52E+04 | 3.65 |
| 500 | 25 | 25 | 5 | 1.36E+05 | 19.78 |
| 500 | 25 | 25 | 10 | 2.99E+05 | 43.34 |
| 500 | 50 | 50 | 1 | 6.87E+03 | 1.00 |
| 500 | 50 | 50 | 5 | 4.92E+04 | 7.13 |
| 500 | 50 | 50 | 10 | 1.27E+05 | 18.35 |
| 250 | 50 | 50 | 1 | 4.47E+02 | 0.06 |
| 250 | 50 | 50 | 5 | 3.36E+04 | 4.87 |
| 250 | 50 | 50 | 10 | 8.74E+04 | 12.68 |
| 125 | 50 | 50 | 1 | 3.18E+03 | 0.46 |
| 125 | 50 | 50 | 5 | 2.60E+04 | 3.76 |
| 125 | 50 | 50 | 10 | 7.01E+04 | 10.17 |
| 50 | 50 | 50 | 1 | 1.50E+03 | 0.22 |
| 50 | 50 | 50 | 5 | 1.25E+04 | 1.81 |
| 50 | 50 | 50 | 10 | 3.00E+04 | 4.35 |

| Flat nozzle | | | | | |
|---|---|---|---|---|---|
| Length (um) | Width (um) | Depth (um) | Velocity (m/s) | Delta P (Pa) | Delta P (psi) |
| 50 | 50 | 10 | 1 | 8.00E+03 | 1.16 |
| 50 | 50 | 10 | 5 | 4.50E+04 | 6.53 |
| 50 | 50 | 10 | 10 | 1.00E+05 | 14.50 |
| 50 | 50 | 20 | 1 | 3.50E+03 | 0.51 |
| 50 | 50 | 20 | 5 | 2.00E+04 | 2.90 |
| 50 | 50 | 20 | 10 | 5.00E+04 | 7.25 |
| 25 | 50 | 10 | 1 | 4.50E+03 | 0.65 |
| 25 | 50 | 10 | 5 | 2.50E+04 | 3.63 |
| 25 | 50 | 10 | 10 | 6.00E+04 | 8.70 |
| 25 | 50 | 20 | 1 | 2.00E+03 | 0.29 |
| 25 | 50 | 20 | 5 | 1.50E+04 | 2.18 |
| 25 | 50 | 20 | 10 | 4.00E+04 | 5.80 |
| 20 | 50 | 20 | 1 | 1.50E+03 | 0.22 |
| 20 | 50 | 20 | 5 | 1.00E+04 | 1.45 |
| 20 | 50 | 20 | 10 | 3.00E+04 | 4.35 |
| 20 | 100 | 20 | 1 | 1.50E+03 | 0.22 |
| 20 | 100 | 20 | 5 | 1.00E+04 | 1.45 |
| 20 | 100 | 20 | 10 | 3.00E+04 | 4.35 |
| 20 | 100 | 15 | 1 | 2.00E+03 | 0.29 |
| 20 | 100 | 15 | 5 | 1.50E+04 | 2.18 |
| 20 | 100 | 15 | 10 | 3.50E+04 | 5.08 |

FIG. 14

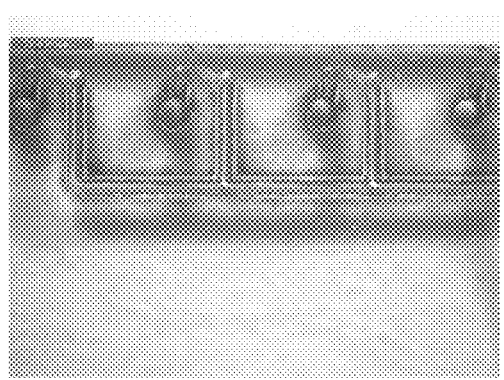 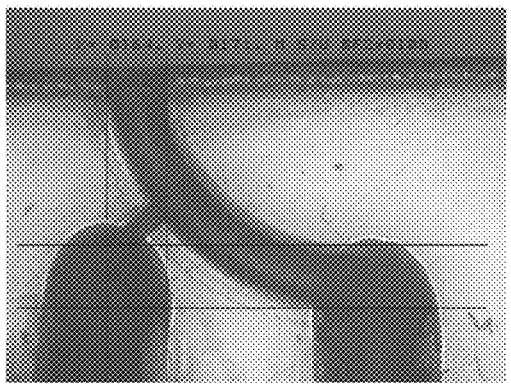
FIG. 41A                    FIG. 41B

MICRONOZZLE ATOMIZERS AND METHODS OF MANUFACTURE AND USE

CROSS REFERENCE TO RELATED APPLICATIONS

This is the U.S. National Stage of International Application No. PCT/US2013/063889, filed Oct. 8, 2013, which was published in English under PCT Article 21(2), which in turn claims the benefit of the earlier filing date of U.S. Provisional Patent Application No. 61/711,128, filed on Oct. 8, 2012. The provisional application is incorporated herein by reference in its entirety.

FIELD

This disclosure relates generally to micronozzle atomizers, and applications and methods of making and using micronozzle atomizers.

BACKGROUND

Micro-fluid processing is a rapidly evolving area in research and industry. The need for control over biochemical and chemical reactions is useful for reducing reagent waste and minimizing sample sizes. Various nozzles have been developed to atomize fluids and direct the atomized fluids towards a sample area. However, such conventional nozzles have several drawbacks, including material incompatibility, size restrictions, low nozzle densities, and high costs associated with the manufacture and/or use of the nozzles.

SUMMARY

This disclosure describes micronozzle devices designed for aerosol generation and constructed using laminated architectures.

In one embodiment, a micronozzle device can include at least one layer comprising a plurality of nozzle exits for delivering a mixture comprising a first fluid and a second fluid, at least one first-fluid header layer having a plurality of first microchannels for receiving the first fluid, at least one first-fluid via layer adjacent the at least one first-fluid header layer to receive the first fluid and direct it to respective ones of the plurality of nozzle exits, at least one second-fluid header layer having a plurality of second microchannels for receiving the second fluid, at least one second-fluid via layer adjacent the at least one second-fluid header layer to receive the second fluid and direct it respective ones of the plurality of nozzle exits, and a plurality of first curtain-gas nozzles located at a first side of the micronozzle device and a plurality of second curtain-gas nozzles located at a second side of the micronozzle device. The first and second curtain-gas nozzles can be sized to deliver air therethrough to define boundary layers that restrict the flow of the mixture of the first and second fluids after exiting the plurality of nozzles.

In some embodiments, the first fluid comprises a paint and the second fluid comprises air. The first fluid can also comprise a coating and the second fluid can comprise a gas. At least one blank layer positioned between a layer containing the first curtain-gas nozzles and an adjacent layer. Alternating layers of first-fluid header and via layers and second-fluid header and via layers can be provided.

In some embodiments, the first-fluid via layers and second-fluid via layers are adjacent the layer having the plurality of nozzle exits, with the vias in the first-fluid via layers and second-fluid via layers being positioned so that the first and second fluids are mixed before being ejected from the plurality of nozzles. At least some of the nozzles exits can be oriented to direct droplets substantially perpendicularly to an edge of the layer on which the nozzle exits are located.

In some embodiments, the micronozzle can be integrated into a micromixer, with a third fluid inlet for receiving a third fluid. The device can be configured to combine the first, second, and third fluids for delivery through the nozzle exits. The first, second, and third fluid can be supplied at disproportionate ratios.

The devices can have dense arrays of micronozzles, enabling high throughput of small droplets. The short nozzle length can have a low pressure drop allowing low pressure delivery techniques to be used to eject droplets, including, but not limited to, pulsing using piezo, thermal inkjet, electrostatic, and acoustic drivers. Constant pressure sources can be used for ejection depending on the application needs. Additionally, if desired, a pressure pulse can be superimposed upon a constant pressure source. Precise dimensional control of nozzles can result in tight droplet size distributions. The formation of these controlled distributions of small droplets can have great utility in a broad number of applications, including, but not limited to, fuel injection, spray drying (especially pharmaceutical production), flash evaporation and distillation, evaporation of fuel entering a combustor, and pulmonary drug delivery.

In one embodiment, a micronozzle device is provided with at least two layers stacked together to form a nozzle array. One or more of the layers includes a plurality of microchannels that have at least one inlet port and a plurality of exit ports, with the exit ports being adjacent to a central fluid flow pathway. The central fluid flow pathway is defined by an annulus of the nozzle array, and the exit ports of the nozzle array face the central fluid flow pathway. Alternating layers of fuel plates and air plates can be provided, with the fuel plates including at least one fuel header channel configured to deliver a fuel to a plurality of vias in the air plate and the air plate including at least one air header channel to deliver air to be mixed with the fuel entering the vias of the air plate to form a mixture of air and fuel.

In one embodiment, a micronozzle device comprises at least two layers stacked together to form a nozzle array. Each layer can include a plurality of microchannels that have an inlet port and an exit port. The exit port can be oriented substantially perpendicular to a central fluid flow pathway.

In specific implementations, the central fluid flow pathway can be defined by an annulus of the nozzle array, and the exit ports of the nozzle array can face the central fluid flow pathway. The annulus of the nozzle array can form an outer perimeter of the central fluid flow pathway. At least one header channel can be configured to provide fluid to the inlet ports of the plurality of microchannels. Each layer can have a first side and a second side, and microchannels can be formed on both the first and second sides. Microchannels on adjacent layers can be in a staggered arrangement so that microchannels on facing surfaces of adjacent layers do not overlap one another. The length of each microchannel can be less than about 250 µm or less than about 125 µm. The width of each microchannel can be greater than about 50 µm.

In other specific implementations, the nozzle array can be positioned within the central fluid flow pathway, and the exit ports of the nozzle array can face the central fluid flow pathway. The exit ports can substantially surround the perimeter of the nozzle array. At least one header channel can be configured to provide fluid to the inlet ports of the plurality of microchannels. Each layer can have a first side and a second side, and microchannels can be formed on both the first and second sides. Microchannels on adjacent layers can be in a staggered arrangement so that microchannels on facing surfaces of adjacent layers do not overlap one another. The length of each microchannel can be less than about 250 µm or less than about 125 µm. The width of each microchannel can be greater than about 50 µm. The nozzle array can include a porous member at an end of the nozzle array. A housing can be provided that has an inner surface that defines the central fluid flow pathway, and at least a portion of the inner surface can be covered by a screen member.

In another embodiment, a micronozzle device can include plurality of nozzle arrays spaced apart from one another to form a secondary pathway therebetween. Each nozzle array can have a plurality of microchannels that have an inlet port and an exit port. The exit port can be oriented substantially parallel to a central fluid flow pathway such that fluid flowing in the central fluid flow pathway can enter the secondary pathways and pass between the plurality of nozzle arrays. Each nozzle array can include a plurality of layers laminated together to form a single structure. At least one header channel can be configured to provide fluid to the inlet ports of the plurality of microchannels. Each layer can have a first side and a second side, and microchannels can be formed on both the first and second sides. Microchannels on adjacent layers can be in a staggered arrangement so that microchannels on facing surfaces of adjacent layers do not overlap one another. The length of each microchannel can be less than about 250 µm or less than about 125 µm. The width of each microchannel can be greater than about 50 µm.

In other specific implementations, a micronozzle device is provided. The device comprises an air plate having an air inlet, an air header microchannel, a plurality of exit ports, and a plurality of vias. The air plate is configured to receive air through the air inlet and deliver the air through the air header microchannel to the plurality of exit ports. The device further comprises a fuel plate having a fuel inlet and a fuel header microchannel. The fuel plate is configured to receive fuel through the fuel inlet and deliver the fuel to the air plate through the plurality of vias formed in the air plate. The air and fuel plates are stacked together to form a nozzle array and the exit ports are oriented substantially perpendicular to a central fluid flow pathway.

In some embodiments, the air plate further comprises metering nozzles positioned between the vias and the exit ports, the metering nozzles being configured to control the flow of fuel delivered to the exit ports. The nozzle array can include a plurality of air plates and a plurality of fuel plates that are stacked together in an alternating arrangement. The central fluid flow pathway can be defined by an annulus of the nozzle array, and the exit ports can be configured to face the central fluid flow pathway. The annulus of the nozzle array can form an outer perimeter of the central fluid flow pathway.

The foregoing and other objects, features, and advantages of the invention will become more apparent from the following detailed description, which proceeds with reference to the accompanying figures.

BRIEF DESCRIPTION OF THE DRAWINGS

FIG. 13A illustrates a top view and FIG. 13B illustrates an end view.

FIG. 14 is another table depicting the relationship between microchannel size and exit velocities and related parameters.

FIG. 41A illustrates another embodiment of a device with an array of nozzles and exits to eject an air/fuel mixture.

FIG. 41B is a close up view of one of the nozzles and exits of FIG. 40.

FIG. 44 is another graph comparing ejected droplet size of various embodiments of nozzles and exits.

FIG. 45 is another graph comparing ejected droplet size of various embodiments of nozzles and exits, at various pressures.

FIG. 46 is another graph comparing ejected droplet size of various embodiments of nozzles and exits, at various pressures.

FIG. 47 is another graph comparing ejected droplet size of various embodiments of nozzles and exits, at various pressures.

FIG. 48 is another graph comparing ejected droplet size of various embodiments of nozzles and exits, at various pressures.

FIG. 49A illustrates a stack of four nozzle plates.

FIG. 49B illustrates an enlarged view of the nozzles and exit channels of the device of FIG. 49A.

FIG. 50 illustrates a chart showing the engine speed and throttle position of a system utilizing a stack of nozzle plates as shown in FIG. 49A to provide an air/fuel mixture to an engine.

FIG. 51 illustrate a chart showing the engine speed and temperature of a system utilizing a stack of nozzle plates as shown in FIG. 49A to provide an air/fuel mixture to an engine.

FIG. 52 illustrates an array of micronozzles that can be used for atomization as part of a desalination process.

FIG. 53 illustrates system that utilizes a plurality of the micronozzle arrays shown in FIG. 52.

FIG. 54 illustrates another view of a system that utilizes a plurality of the micronozzle arrays shown in FIG. 52.

FIG. 55 illustrates a micronozzle atomizer constructed using a layered architecture.

FIG. 56 is an end view of the micronozzle atomizer of FIG. 55.

FIG. 57 illustrates a micromixer.

FIG. 58 is an end view of a micronozzle atomizer.

FIG. 59 illustrates exemplary airblast nozzles for droplet formation.

FIG. 60 illustrates exemplary airblast nozzles for droplet formation.

FIG. 61 illustrates exemplary airblast nozzles for droplet formation.

FIG. 62 illustrates an embodiment in which a first channel intersects with a second channel.

FIG. 63 illustrates an embodiment in which a first channel intersects with a second channel.

FIG. 64 illustrates an embodiment in which a channels intersects with other channels.

FIG. 65 illustrates an edge view of a nozzle exit.

FIG. 66 shows a side view of a nozzle exit

FIG. 67A shows exemplary variations of nozzle densities.

FIG. 67B shows an exemplary embodiment of a device having a drain.

FIG. 68 illustrates an exemplary pressure sensor that can be formed on a thin laminate for use in the laminated architectures.

FIG. 69 illustrates an exemplary flow sensing device that can be formed on a laminate.

FIG. 70 illustrates an exemplary temperature sensing device that can be formed on a laminate.

FIG. 71 illustrates an example of an atomizer system with multiple inputs and process control measurement points.

FIG. 72 illustrates an exemplary system for obtaining measurement inputs and altering the operation of the system based on the feedback obtained from the measurement inputs.

DETAILED DESCRIPTION

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" and "achieve" to describe the disclosed methods. These terms are high-level abstractions of the actual operations that are performed. The actual operations that correspond to these terms may vary depending on the particular implementation and are readily discernible by one of ordinary skill in the art.

The embodiments described herein include micronozzle devices constructed using layers of patterned sheets to form laminated architectures. The materials can include polymers, metals, or, in some cases, ceramics. The layers can be bonded to create leak-free self contained structures. Bonding techniques can include, but are not limited to, diffusion bonding, diffusion brazing, welding, adhesively bonding, ultrasonically bonding, microwave welding, and infrared welding.

There are applications, however, where it may be desirable to disassemble the construction; in these cases a fixture holding the layers under compression can be used. Alternately, adhesives than can be dissolved or otherwise removed to allow disassembly and rework may be used.

As described in more detail below, the nozzle arrays can be provided in various configurations and orientations, including annular, center feed, and collinear-flow configurations.

As used herein, the term "curtain-gas" refers to any structure that can create air flows that affect the flow of other adjacent fluids. "Curtain gas" nozzles include, for example, nozzles that deliver air or other gases, including inert and reactive gases. In addition, although the term "air" is used to describe the fluid used in certain embodiments, it should be understood that other suitable gases can be used, depending on the application.

Annular Configurations

Figure 1:
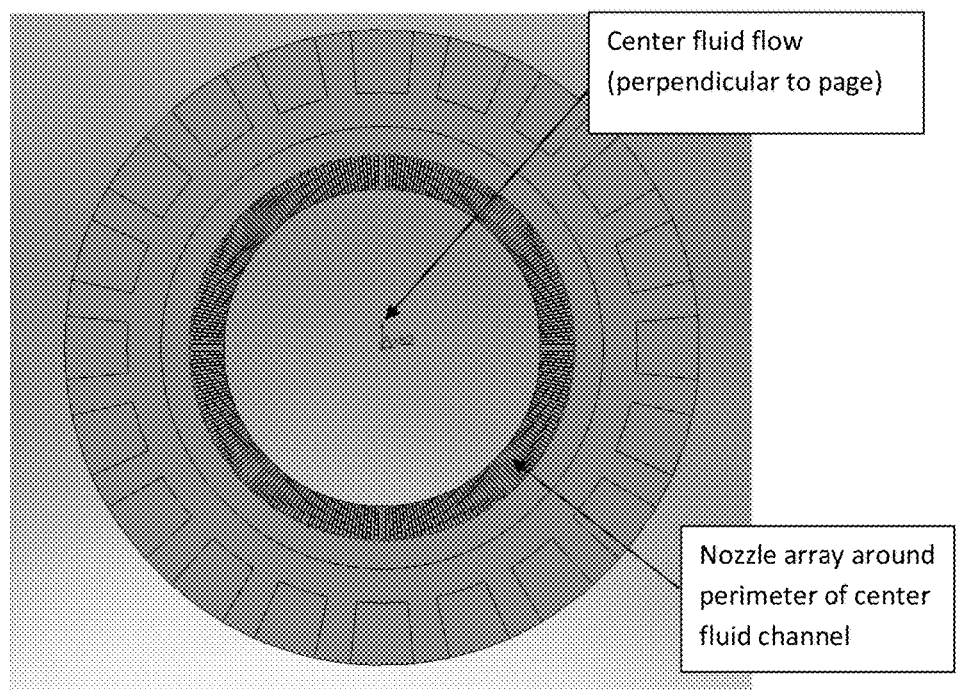
FIG. 1 illustrates an embodiment of a micronozzle device with a laminated architecture that has an annular structure, wherein atomized fluid can be directed perpendicularly into a center fluid channel or flow stream.

FIG. 1 illustrates an embodiment of a micronozzle device with a laminated architecture that has an annular structure. A plurality of nozzle microchannels can be positioned so that they at least partially surround the outer perimeter of the center pathway or channel through which bulk fluid can flow. Thus, atomized fluid can be directed perpendicularly out of each microchannel into the flow stream of fluid in the center channel.

Figure 2:
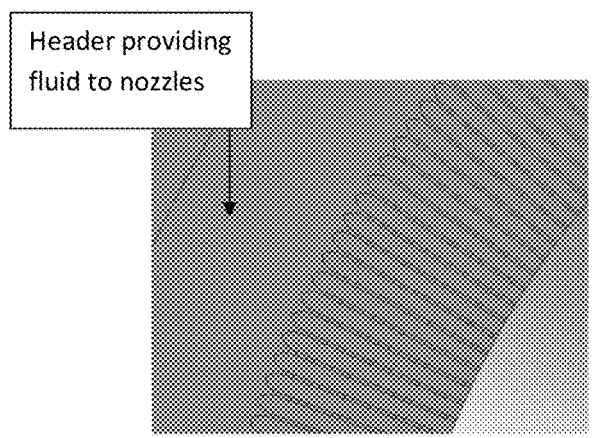
FIG. 2 is an enlarged top view of an embodiment of a nozzle plate (layer) shown in FIG. 1.
Figure 3:
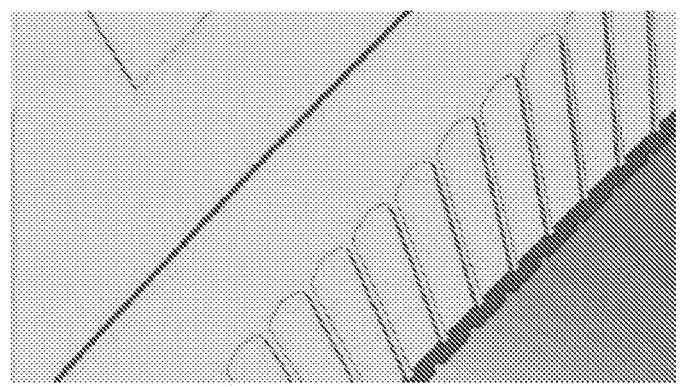
FIG. 3 is an enlarged perspective view of an embodiment of a nozzle plate (layer) shown in FIG. 1, showing microchannels on both sides of the plate.

FIG. 2 is an enlarged top view of an embodiment of a nozzle plate or layer of the laminated micronozzle device shown in FIG. 1. As shown in FIG. 2, a header can provide fluid to the plurality of microchannels. The nozzle plate or layer can include microchannel structures on both sides of the plate as shown in FIG. 3.

Figure 4:
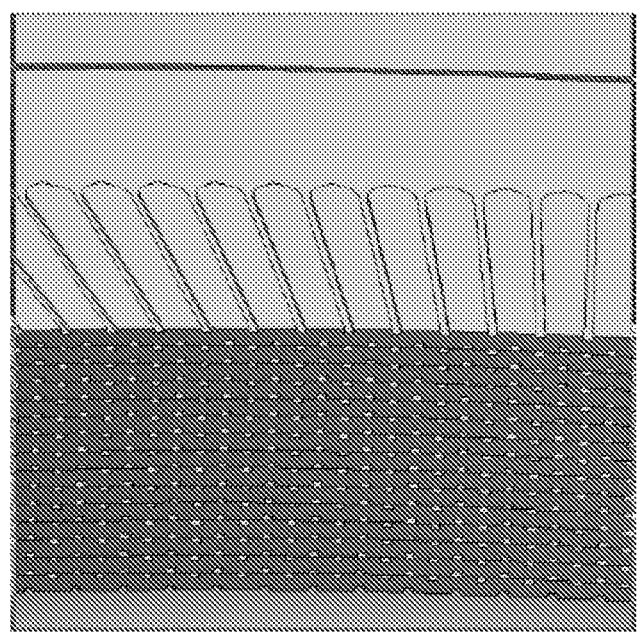
FIG. 4 is a side perspective view of an embodiment of a micronozzle device with a plurality of nozzle plates (layers).

FIG. 4 is a side perspective view of an embodiment of a micronozzle device with a plurality of nozzle plates or layers. Each of these plates can include microchannel structures on both sides (FIG. 3). In addition, as shown in FIG. 4, microchannels on adjacent plates can be in a staggered arrangement so that microchannels on adjacent plate surfaces do not overlap one another.

Figure 5:
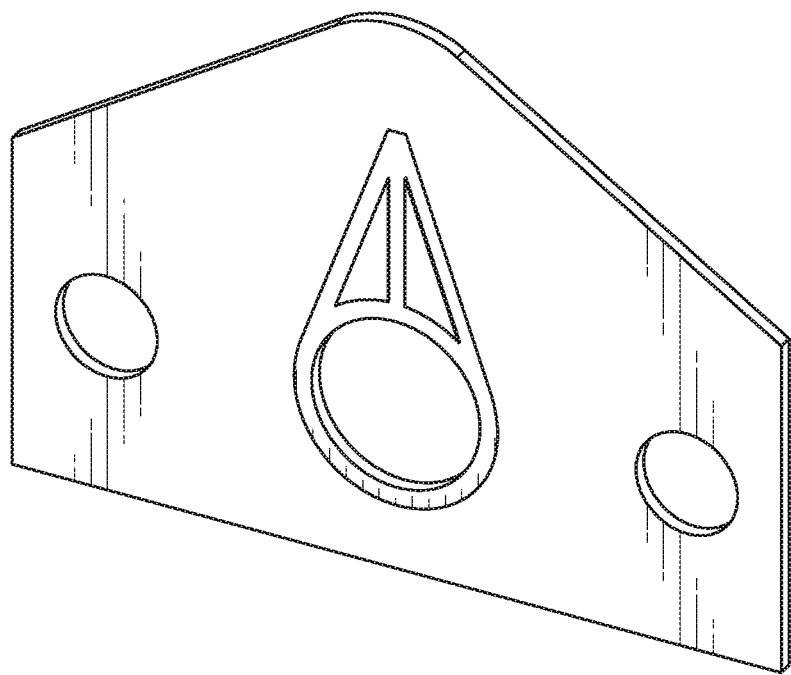
FIG. 5 is a perspective view of an embodiment of a nozzle plate configured for a 9 mm air intake bore.
Figure 6:
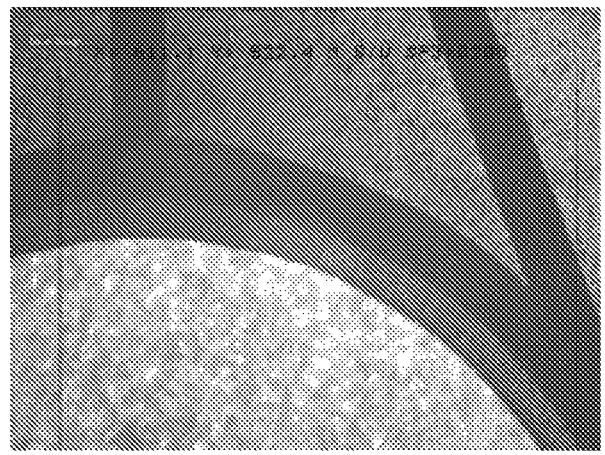
FIG. 6 illustrates an enlarged view of the nozzle plate of FIG. 5 constructed out of Viton®.
Figure 7:
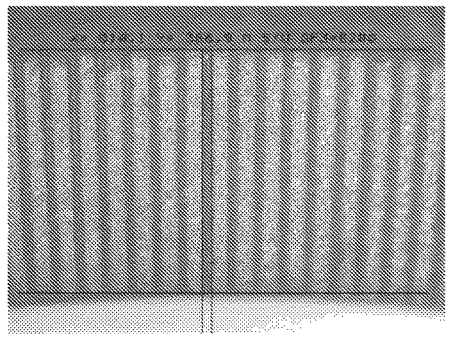
FIG. 7 illustrates a further enlarged view of a plurality of microchannels of the nozzle plate of FIG. 5.
Figure 8:
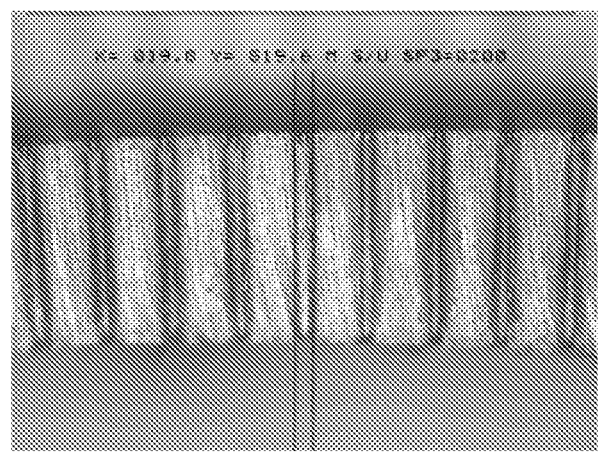
FIG. 8 illustrates an enlarged view of a plurality of microchannels of the nozzle plate of FIG. 5, which are laser cut in stainless steel.
Figures 9, 10:
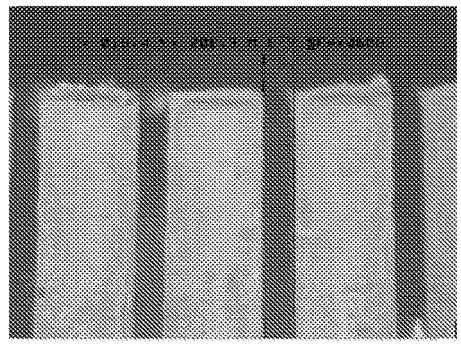
FIG. 9 illustrates an enlarged view of a plurality of microchannels of the nozzle plate of FIG. 5, which are laser cut in polyetherimide.
FIG. 10 is a table depicting the relationship between microchannel size and exit velocities and related parameters.

FIG. 5 is a perspective view of an embodiment of a nozzle plate configured for a 9 mm air intake bore. As shown in FIGS. 6-9 and as discussed above, an annular laminated architecture nozzle device can be constructed of various materials. For example, FIGS. 6 and 7 are enlarged views of a nozzle plate constructed out of Viton®, FIG. 8 is an enlarged view of a plurality of microchannels that are laser cut in stainless steel, and FIG. 9 is an enlarged view of a plurality of microchannels that are laser cut in polyetherimide.

Figure 11A:
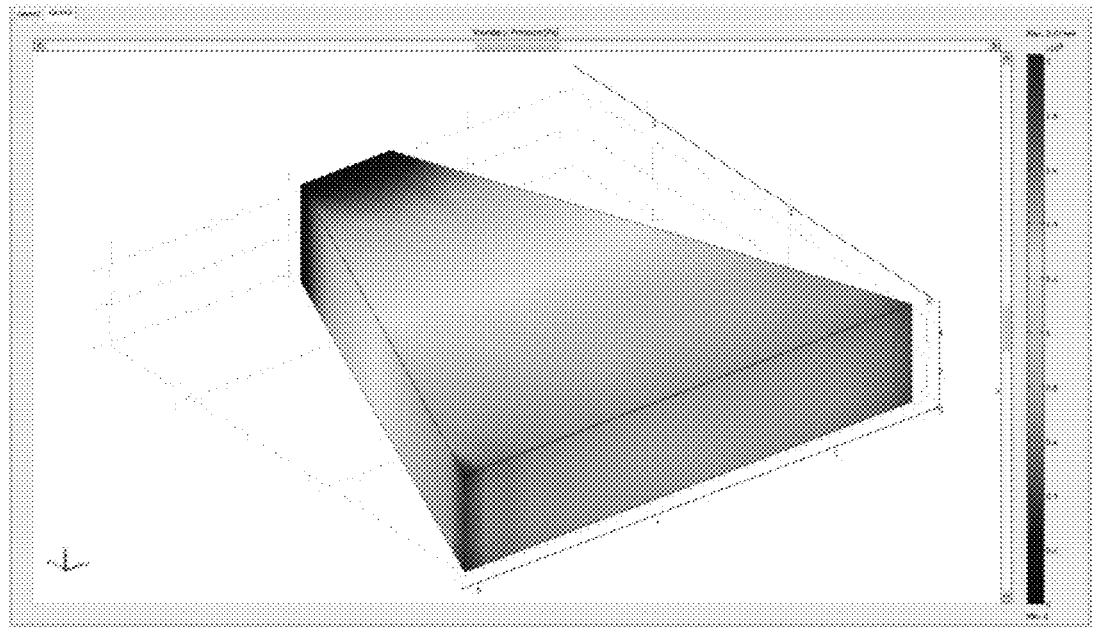
FIGS. 11A and 11B show modeling results of two different length microchannel configurations.
Figure 11B:
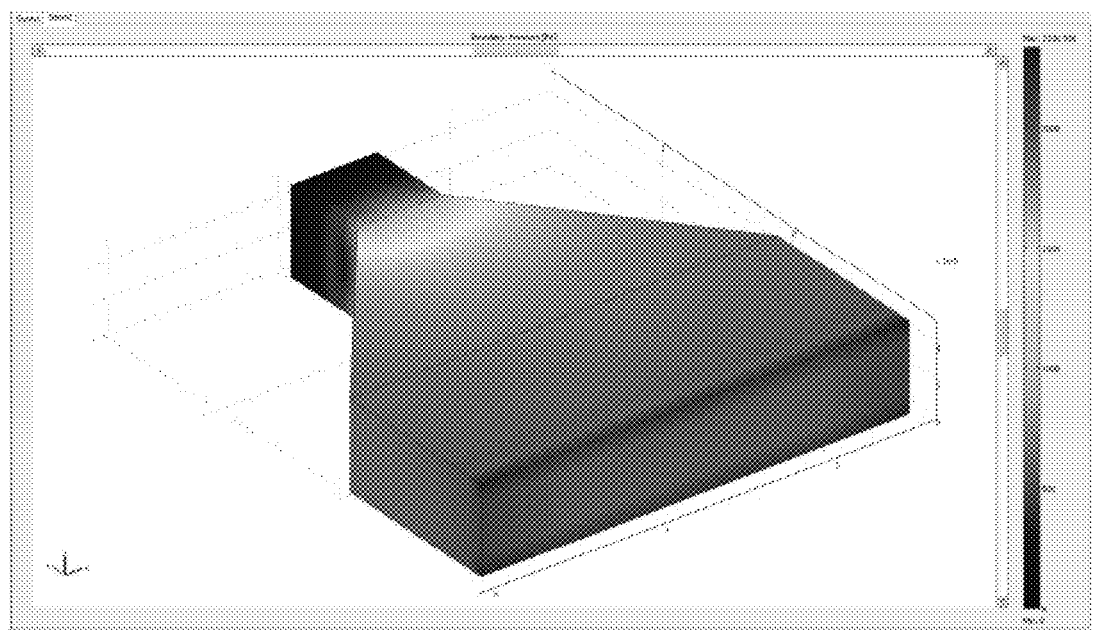

In certain embodiments, it can be desirable to achieve a certain pressure drop through the nozzle. For example, a pressure drop that is acceptable for inkjet-type dispensing preferably exhibits an exit velocity of between about 5-10 m/s and a psi of less than about 10. As shown in FIGS. 10, 11A, and 11B, shorter nozzles can be preferable to achieve a lower psi. For example, FIG. 10 shows a table depicting the relationship between microchannel size and exit velocities and related parameters. As shown in FIG. 10, nozzles less than 250 μm and, more preferably less than about 125 μm, and, even more preferably, less than about 100 μm (e.g., about 50 μm) can be particularly desirable for such applications. FIGS. 11A and 11B show modeling results of two different length microchannel configurations, which also reveals that advantages can be achieved by using nozzles with shorter lengths.

Figure 12:
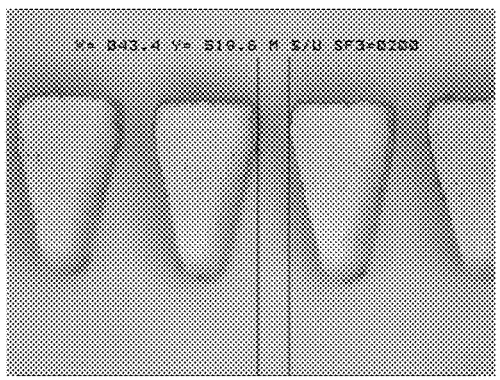
FIGS. 12A and 12B illustrate nozzles embossed in polycarbonate from photolithographic masters.
Figure 12B:
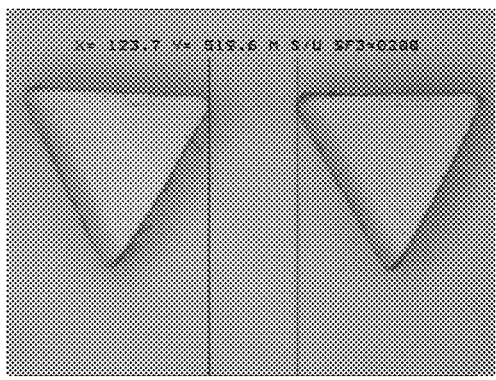
Figure 13A:
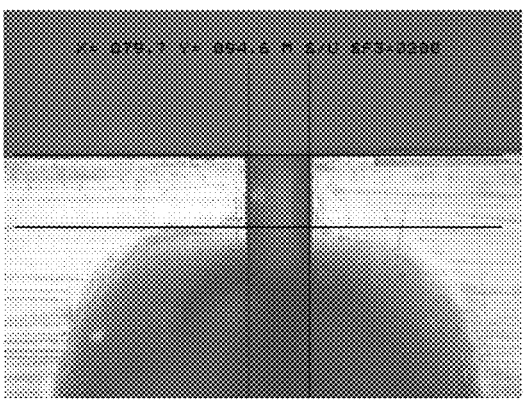
FIGS. 13A and 13B illustrate nozzles laser machined in polyetherimide.
Figure 13B:
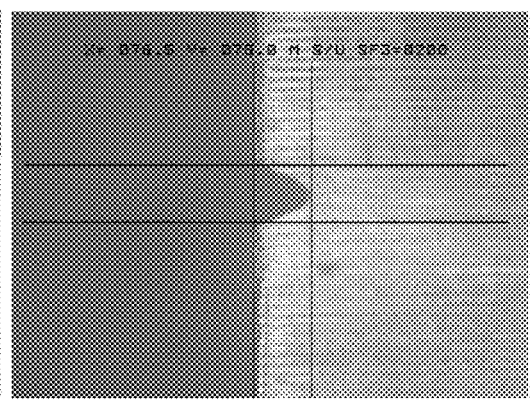

As discussed above various methods can be used to create the microchannel structures disclosed herein. Desirably, however, appropriate nozzle bores and lengths can be achieved using photolithographic methods and/or laser machining. FIGS. 12A and 12B illustrate nozzles that were created using hot embossing from a photolithographic master. FIGS. 13A and 13B illustrate shorter nozzles that were laser machined in polyetherimide. FIG. 13A illustrates a top view and FIG. 13B illustrates an end view.

As noted above, shorter nozzles with lower pressure drops can have certain advantages with respect to small droplet formation. As reflected in FIG. 14, in another embodiment, wide, shallow nozzles can be used to further improve small droplet formation. As reflected in the table shown in FIG. 14, the pressure drop can be substantially independent of width at the aspect ratios of interest, which can enable high fluid (e.g., fuel) throughput per nozzle.

Figure 15:
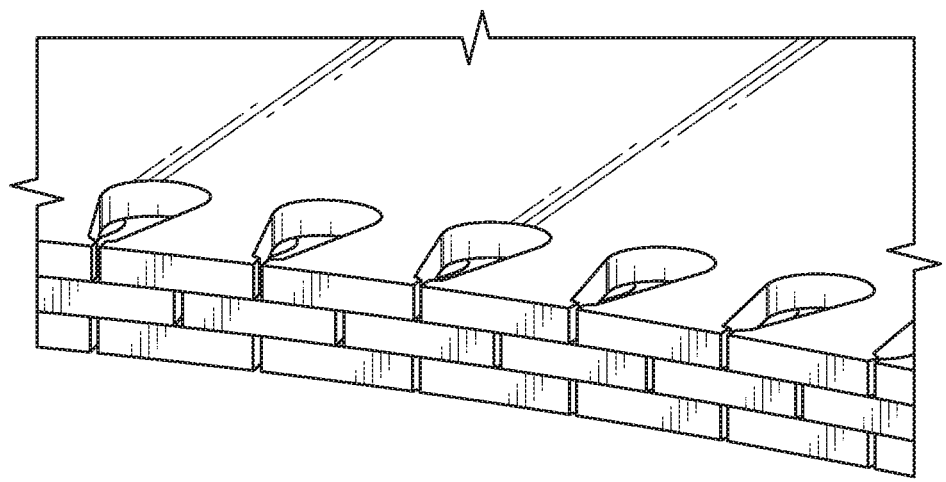
FIG. 15 illustrates vertical through-cut nozzles fed from ports in communication with header plates.
Figure 16:
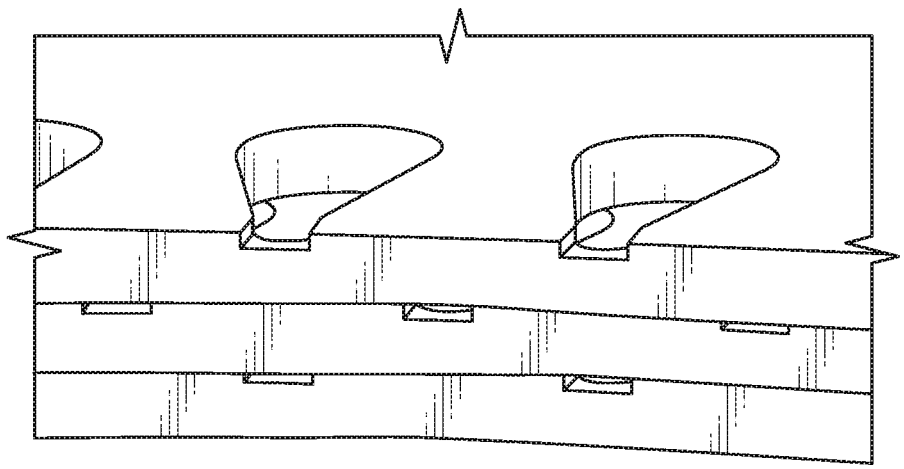
FIG. 16 illustrates horizontal blind-cut nozzles fed from ports in communication with header plates.

FIGS. 15 and 16 illustrate various wide, shallow nozzles that can be constructed using, for example, laser machining or embossing techniques. FIG. 15 illustrates vertical through-cut nozzles fed from ports in communication with header plates. FIG. 16 illustrates horizontal blind-cut nozzles fed from ports in communication with header plates. To the extent that fluid collection around the nozzle exit (e.g., "puddling") affects droplet ejection, features such as gutters and protruding nozzle exits can be implemented to alleviate such problems.

Center Feed Configurations

In this embodiment, a nozzle device can be positioned within a flow stream or pathway and fluid can be jetted perpendicularly outwards from the nozzle device into the bulk fluid stream.

Figure 17:
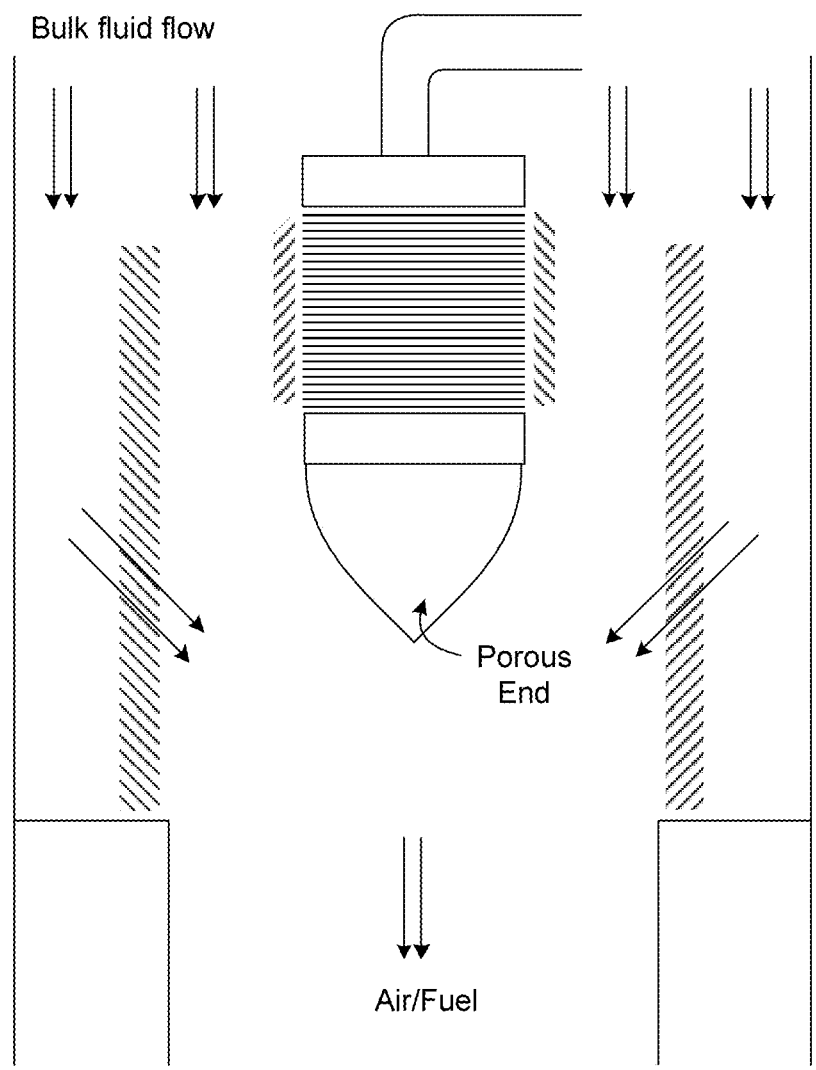
FIG. 17 illustrates an embodiment of a center feed configuration in which bulk fluid flows in an annulus at least partially surrounding the nozzle (injector).

FIG. 17 illustrates an embodiment of a center feed configuration in which bulk fluid flows in an annulus at least partially surrounding the nozzle (injector). The bulk fluid can flow in a pathway or annulus around the injector. This configuration can result in a simpler bonding arrangement, which can result in fewer leak paths. FIG. 17 illustrates a design configuration that can be used, for example, as a fuel injector or other similar devices. A porous end piece can capture droplets produced by nozzle surface wetting, and a screen can be provided along the wall to reduce wetting of the outer wall. These structures can provide large surface areas to enhance evaporation of the wetting fluid. For applications that involve fuel injection and fuel evaporation, it can be particularly helpful to prevent large droplet transport into the reaction or combustion chambers.

Figure 18:
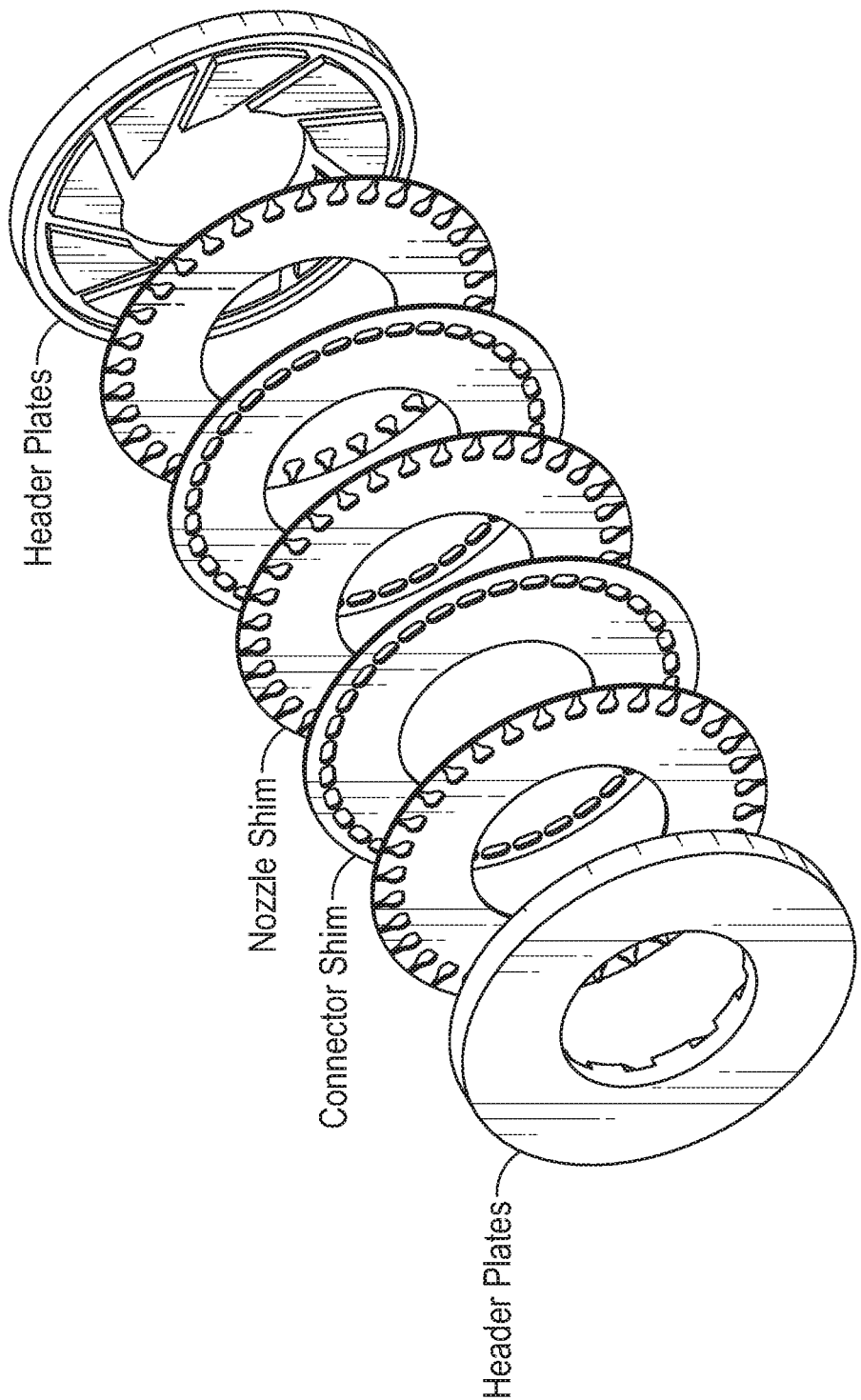
FIG. 18 illustrates another embodiment of a center feed configuration with a plurality of nozzle channels extending outwards to the perimeter of a nozzle (injector).
Figure 19:
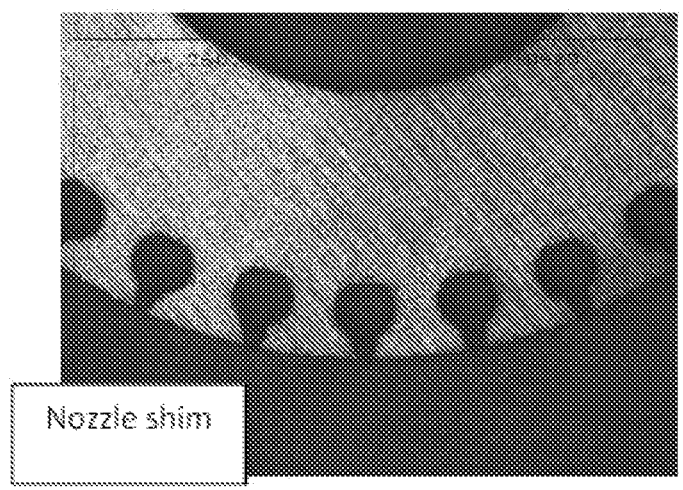
FIG. 19 shows an enlarged view of a nozzle shim of the type shown in FIG. 18.
Figure 20:
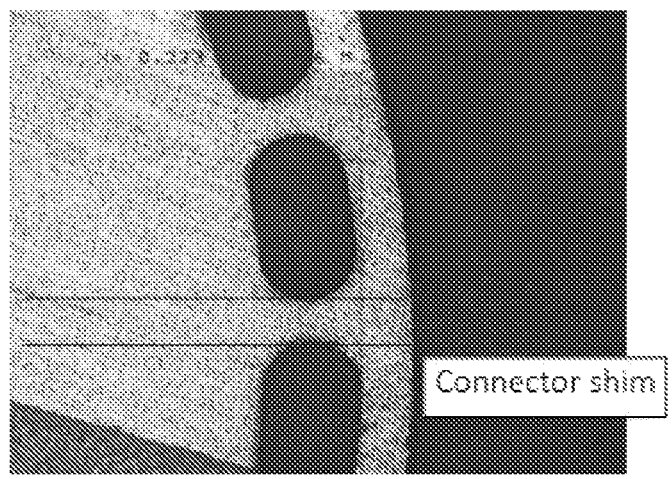
FIG. 20 shows an enlarged view of a connector shim of the type shown in FIG. 18.

FIG. 18 illustrates another embodiment of a center feed configuration with a plurality of nozzle channels extending outwards to the perimeter of a nozzle (injector). The structure of FIG. 18 can include a pair of header plates and a plurality of connector shims and nozzle shims. FIG. 19 shows an enlarged view of a nozzle shim, and FIG. 20 shows an enlarged view of a connector shim.

Collinear Configurations

In this embodiment, fuel (or other fluids) can be jetted through nozzles that are oriented in the same direction as the air flow. By providing a plurality of nozzles that are spaced apart, air can flow between layers of nozzle plates. Although the nozzle density of this embodiment can be less than the other embodiments described herein, this configuration can be helpful to reduce wall wetting, particularly in small devices. The spacing between the nozzle plates can be a function of the allowable pressure drop of the air though the device.

Figure 21:
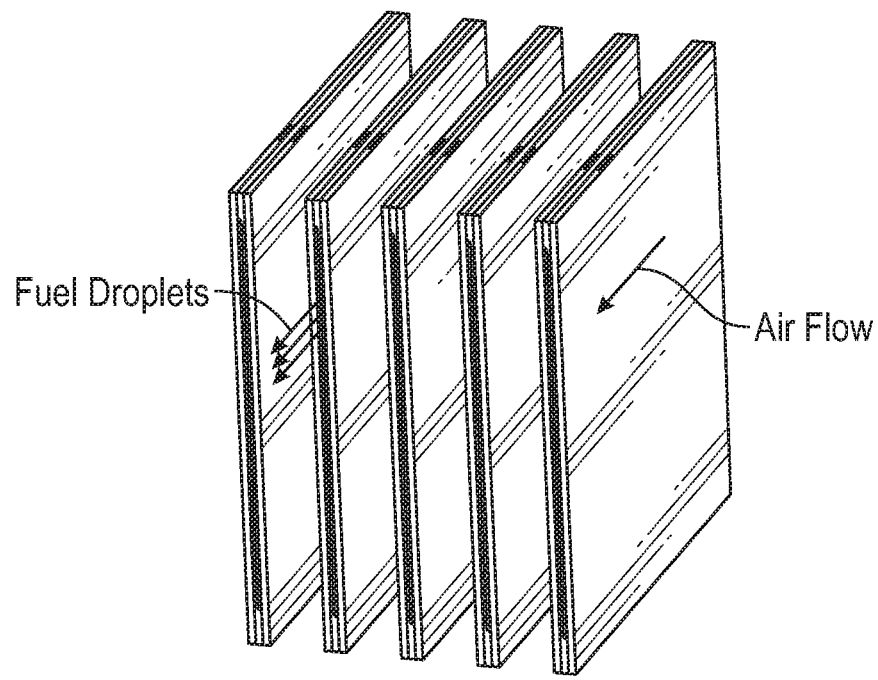
FIG. 21 illustrates an embodiment of a collinear flow configuration with a plurality of nozzles oriented in the same direction as bulk fluid flow.
Figure 22:
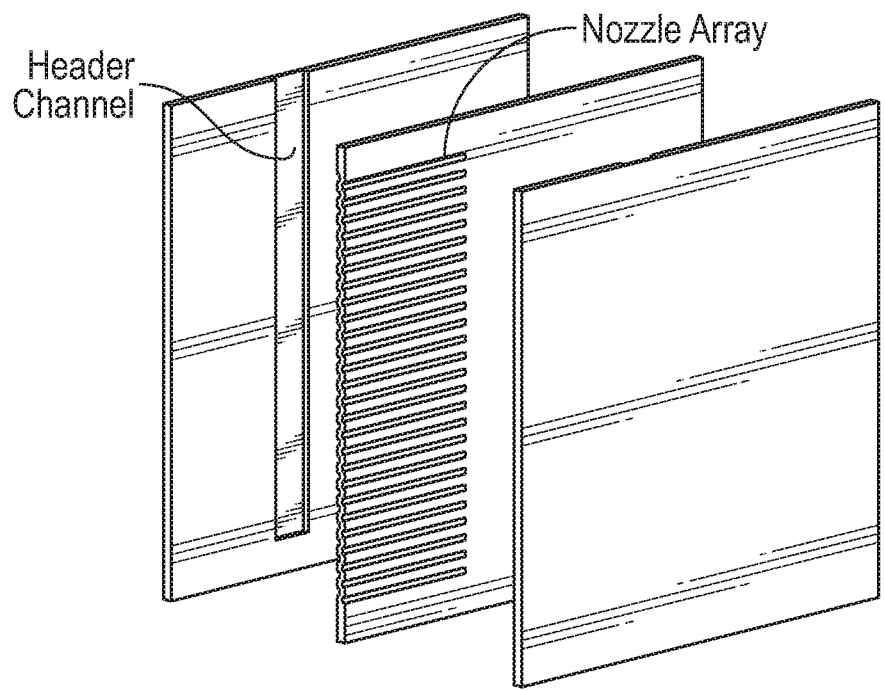
FIG. 22 illustrates an exploded view of a subunit shown in FIG. 21.

FIG. 21 illustrates an embodiment of a collinear flow configuration with a plurality of nozzles oriented in the same direction as bulk fluid flow. The nozzle subunits in FIG. 21 are shown spaced apart from one another to permit fluid flow between adjacent subunits. FIG. 22 illustrates an exploded view of a subunit, which can include at least one header channel and at least one nozzle array. Desirably, a header channel can be positioned on each side of the nozzle array.

Figure 24:
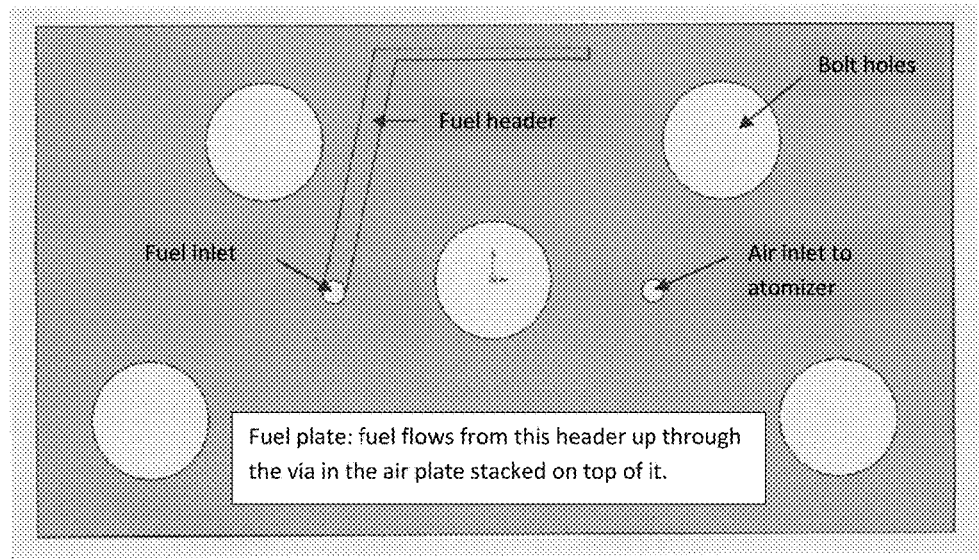
FIG. 24 illustrates a fuel plate with an fuel inlet, a fuel header, and an air inlet to the atomizer.
Figure 25:
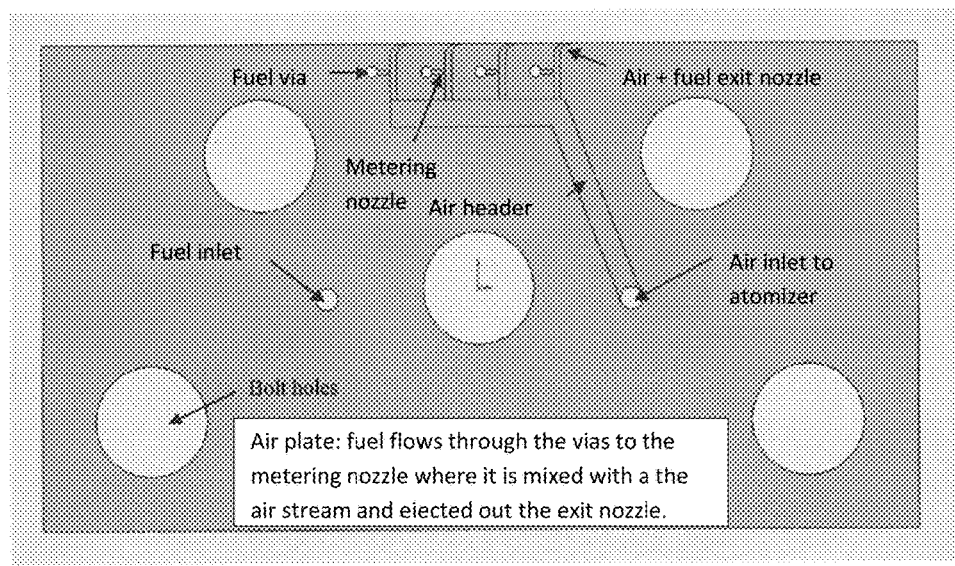
FIG. 25 illustrates an air plate through which fuel can flow through the vias to the metering nozzle where the fuel is mixed with an air stream and ejected out the exit nozzle.

The following embodiments of airblast atomizers can advantageously impart lateral kinetic energy to an air/fuel mixture by inducing breakup of the fuel into even smaller droplets. FIG. 24 illustrates a fuel plate that is configured to allow fuel to flow from a header (up through a via) into an air plate that is stacked on top of the fuel plate. FIG. 24 illustrates a fuel inlet, a fuel header, and an air inlet to the atomizer. FIG. 25 illustrates a respective air plate through which fuel can flow through the vias to the metering nozzle where the fuel is mixed with an air stream and ejected out the exit nozzle.

Figure 26:
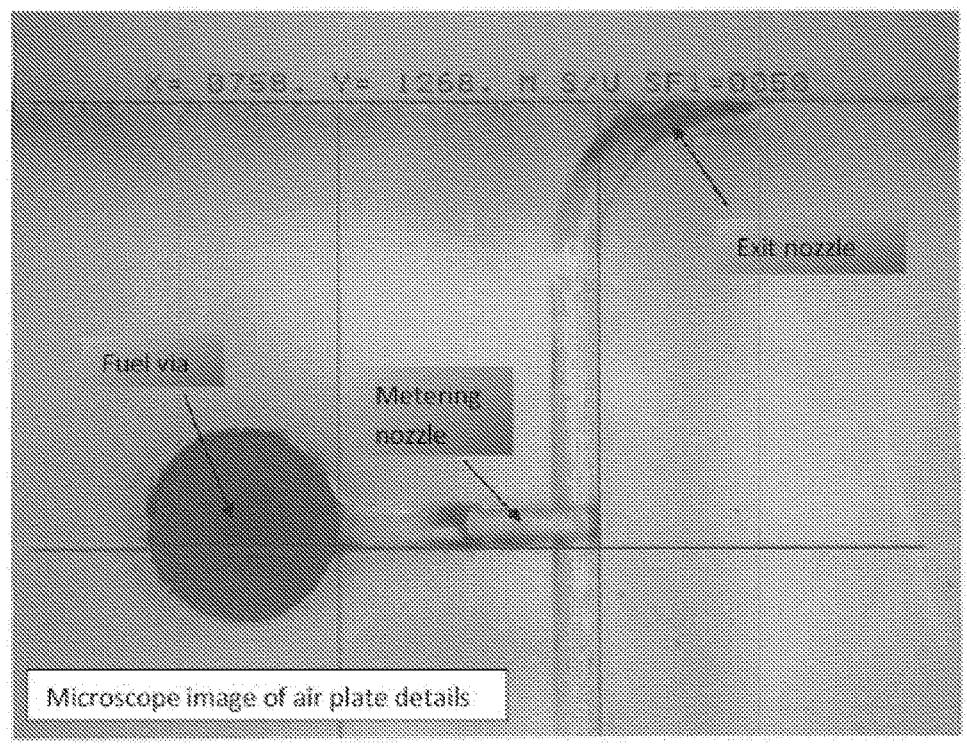
FIG. 26 is a microscopic image of a portion of the air plate shown in FIG. 25.
Figure 27:
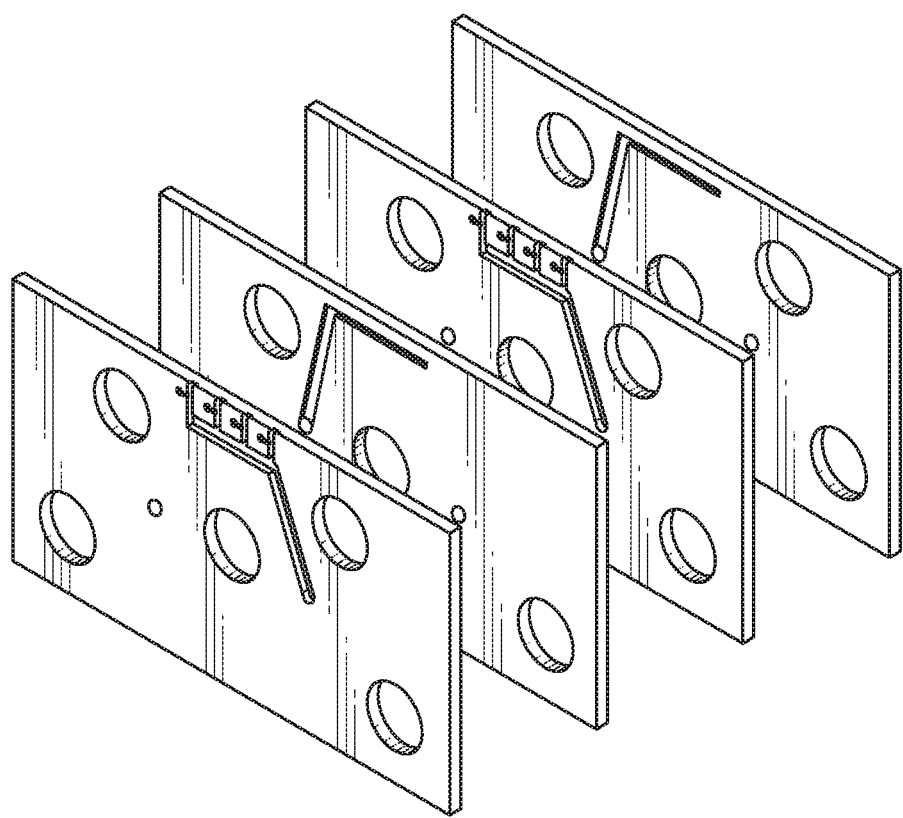
FIG. 27 illustrates a stacked configuration of fuel plates (FIG. 24) and air plates (FIG. 25).

FIG. 26 is a microscopic image of a portion of the air plate shown in FIG. 25. Referring to FIG. 26, fuel enters through the fuel via (which is fed from the fuel header shown in FIG. 24) and delivered through the metering nozzle where it is mixed with air from the air header (FIG. 25). FIG. 27 illustrates a stacked configuration of fuel plates (FIG. 24) and air plates (FIG. 25). As shown in FIG. 27, fuel and air plates can be in an alternating stacked architecture.

Figure 28:
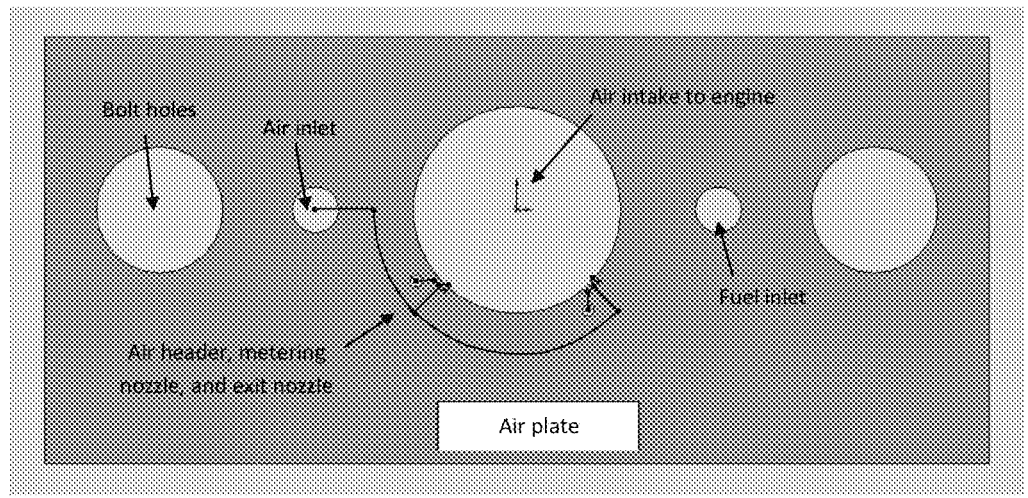
FIG. 28 illustrates another embodiment of an air plate.
Figure 29:
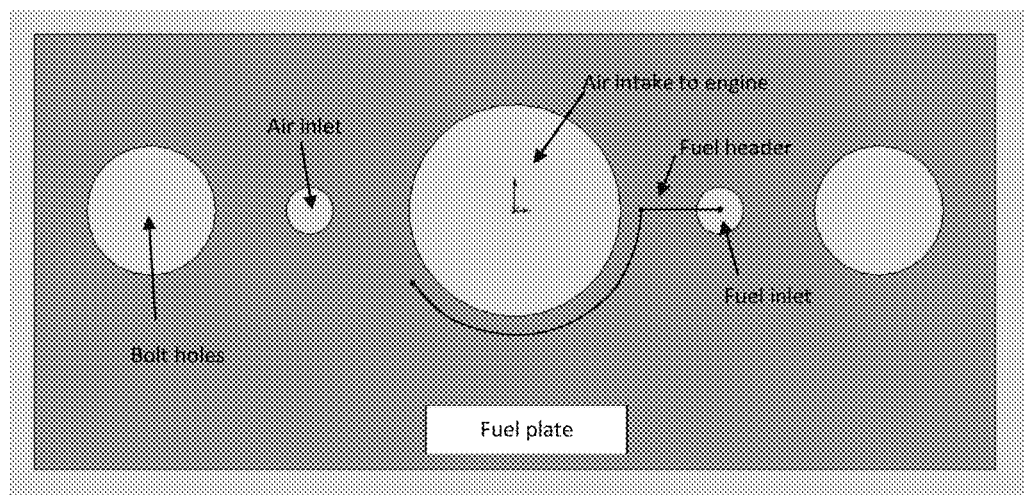
FIG. 29 illustrates another embodiment of a fuel plate.
Figure 30:
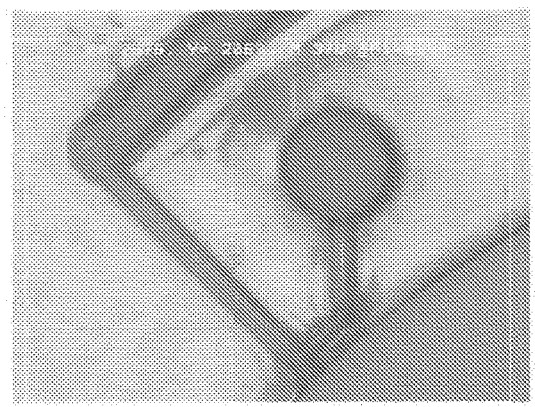
FIG. 30 is a microscopic image of a portion of the air plate shown in FIG. 28.

FIGS. 28-30 illustrate another embodiment of an airblast nozzle. In this embodiment, an annular configuration is provided with the air and fuel mixture being introduced to a central air intake unit to deliver the air/fuel mixture to an engine (e.g., a two-cycle engine). As shown in FIGS. 28 and 29, air and fuel can be delivered through air and fuel headers, respectively, to be mixed and delivered through one or more exit nozzles to the central air intake passage. FIG. 30 illustrates a microscopic image of a portion of the air plate shown in FIG. 28. As shown in FIG. 30, fuel is delivered from the fuel plate (FIG. 29) through a via, then through a metering nozzle to be mixed with air arriving from the air header.

Figure 31:
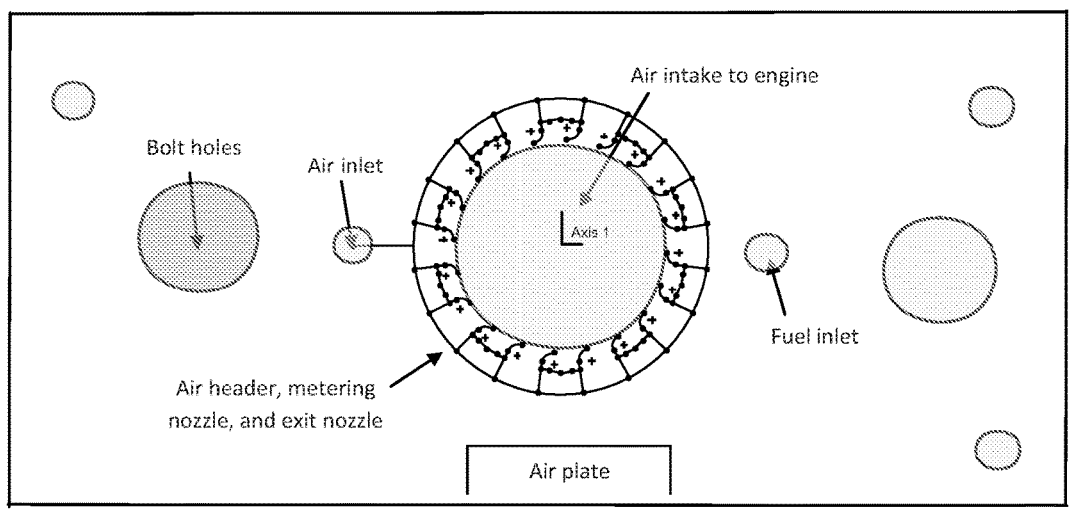
FIG. 31 illustrates another embodiment of an air plate.
Figure 32:
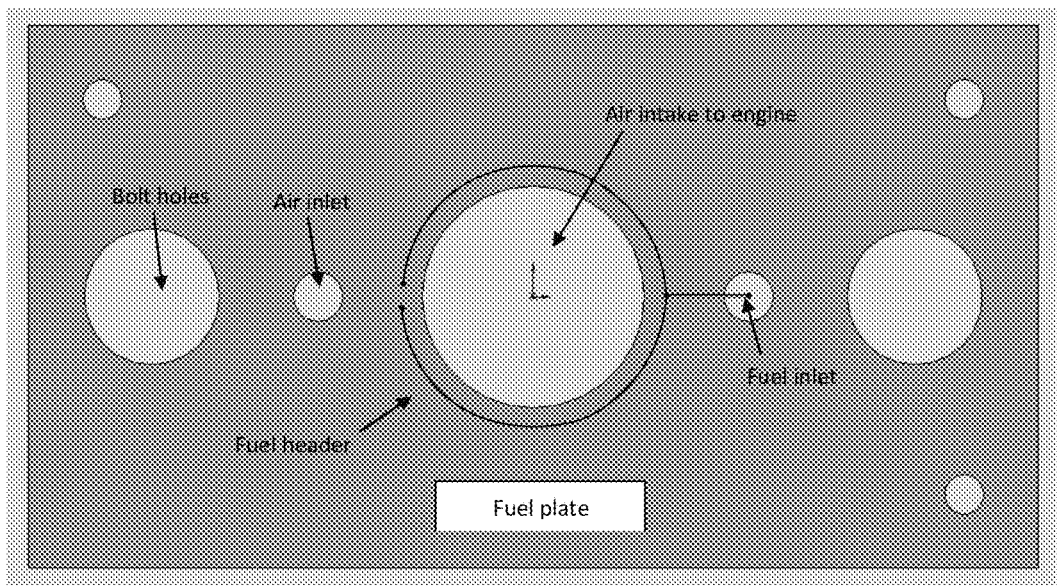
FIG. 32 illustrates another embodiment of a fuel plate.
Figure 33:
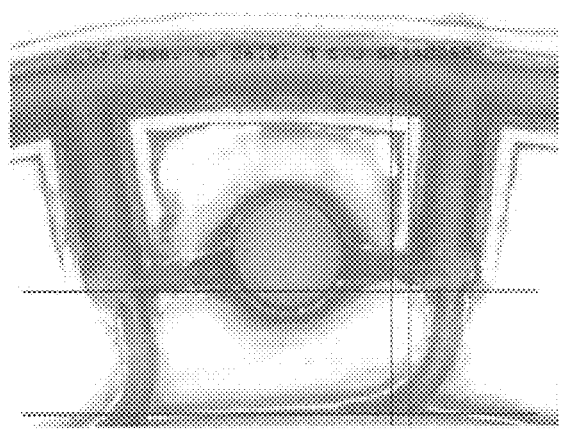
FIG. 33 is a microscopic image of a portion of the air plate shown in FIG. 31.

FIGS. 31-33 show an embodiment similar to that shown in FIGS. 28-30, but with additional exit nozzles to provide increased delivery of air/fuel mixture at lower pressures. For example, the air plate shown in FIG. 31 and the fuel plate shown in FIG. 32 can be provided in a stacked configuration with a desired number of air and fuel plates. As shown in FIGS. 31 and 32, air and fuel can be delivered through air and fuel headers, respectively, to be mixed and delivered through the exit nozzles provided in the vicinity of the central air intake passage. FIG. 33 illustrates a microscopic image of a portion of the air plate shown in FIG. 30. As shown in FIG. 33, fuel is delivered from the fuel plate (FIG. 32) through one or more vias, then through one or more metering nozzles to be mixed with air arriving from the air header.

Figure 59:
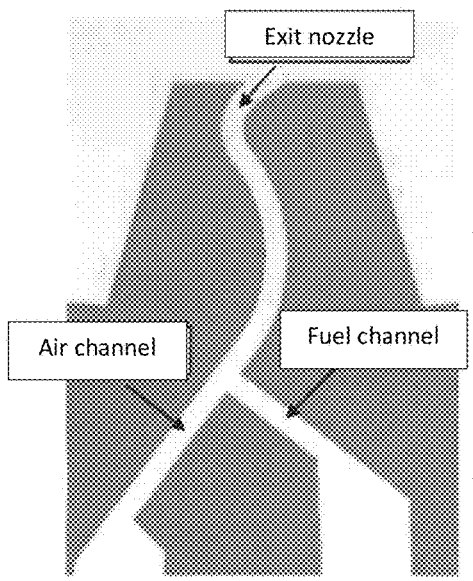
Figure 60:
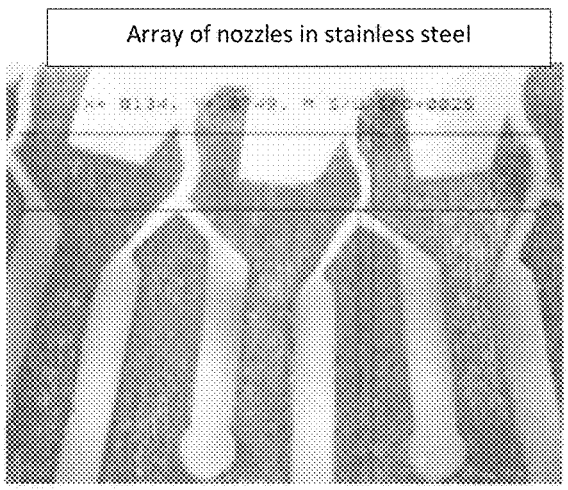

FIGS. 59 and 60 illustrate additional airblast type nozzles that can achieve droplet formation. As shown in those figures, air and fuel channels can merge near the exit nozzle to create a gas/liquid blend. The exit nozzle can have a curvature that induces lateral kinetic energy to aid in droplet formation. In one example, exit nozzles with widths of 80 μm achieved droplets dispersions of kerosene with Sauter mean diameters of less than 20 μm. The architecture of the systems described herein is easily scalable, with the resolution being the amount of fluid ejected from a single nozzle.

Figure 61:
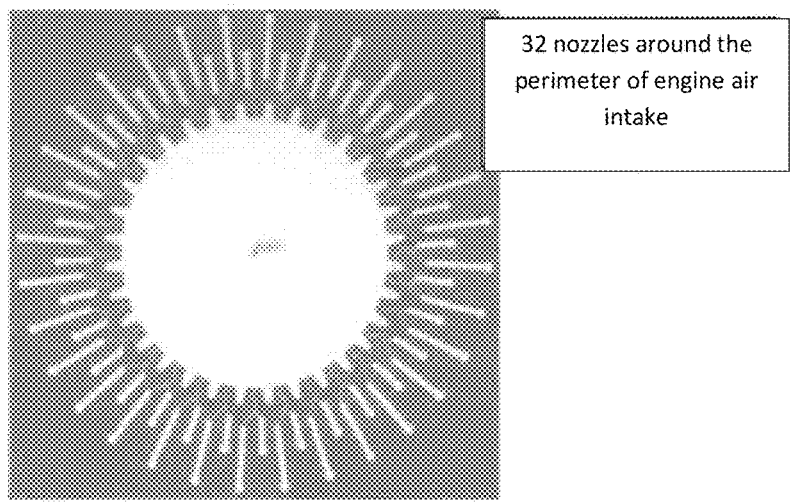

For example, FIG. 61 illustrates 32 nozzles around the perimeter of an engine air intake. In one embodiment, flows ranging from 0.1 to 1 cc/min are provided for fuel injection. To gain higher throughput, nozzles can be arrayed in parallel. For fuel injection devices, valving schemes can dynamically control the throughput.

EXAMPLES

Different embodiments of devices were tested. The attributes of each of the embodiments of the devices tested are shown below in Table 1. The width measurements were made using a magnification of 200×, which is greater than the magnification of the images shown herein.

TABLE 1

| Nozzle design | Nozzle W (micron) | Exit W (micron) | Shape | Exit orientation |
|---|---|---|---|---|
| single nozzles | | | | |
| Ex. 1 (AB4H) | 83 | 156 | curved | perpendicular |
| Ex. 2 (AB4D) | 59 | 83 | curved | perpendicular |
| Ex. 3 (AB4C) | 48 | 118 | curved | perpendicular |
| Ex. 4 (AB3-3) | 91 | 153 | curved | tangent |
| Ex. 5 (AB5D2) | 68 | 158 | curved | perpendicular |
| Ex. 6 (AB5C) | 48 | 137 | straight | perpendicular |
| nozzle arrays | | | | |
| Ex. 7 (AB3L) | 87 | 171 | curved | tangent |
| Ex. 8 (AB4L) | 63 | 96 | curved | perpendicular |

The testing was performed using a phase doppler particle analyzer (manufactured by TSI, Inc, St. Paul, Minn.). The analyzer was used to measure droplet sizes during spray drying operations which typically use acetone as a delivery solvent. The laser and detector of the analyzer were therefore mounted to view into a spray drying vessel where the solvent could be safely contained. The test devices were mounted on the end of a rod, with air and fuel lines fed up through it, connecting to the supplies. House nitrogen was used as the gas supply and also provided pressure for fuel delivery. Standard kerosene was used as the fuel. The rod is mounted on a linear drive to allow measurements of particle sizes across the width of the plume (the laser beam is stationary, the plume from the device is moved through the beam).

The detector captures data from interference fringes generated from droplets at the point where the two laser beams (split from one) intersect. As such, the precise point where data is collected can be controlled. For most measurements this distance was approximately 0.5 inches.

Figure 34:
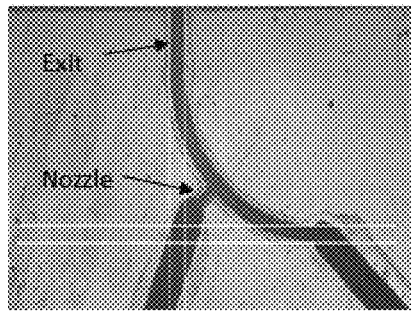
FIG. 34 illustrates an embodiment of a device with a nozzle for mixing air and fuel and an exit for ejecting the air/fuel mixture.
Figure 35:
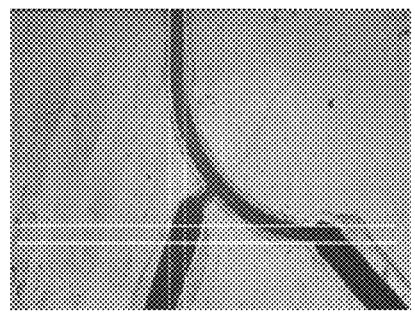
FIG. 35 illustrates another embodiment of a device with a nozzle and an exit to eject an air/fuel mixture.
Figure 36:
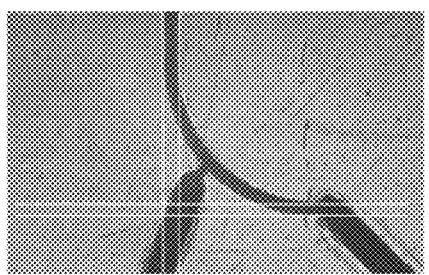
FIG. 36 illustrates another embodiment of a device with a nozzle and an exit to eject an air/fuel mixture.

Images of portions of the devices tested in Examples 1-3 are shown in FIGS. 34-36, respectively. In some of the disclosed embodiments, lateral energy is induced through a curved exit channel. For example, FIGS. 34-36 illustrate curved exit channels that are oriented so that the droplets are ejected generally perpendicularly to the edge of the plate. The nozzle and exit widths of these embodiments vary as shown above in Table 1.

Figure 37:
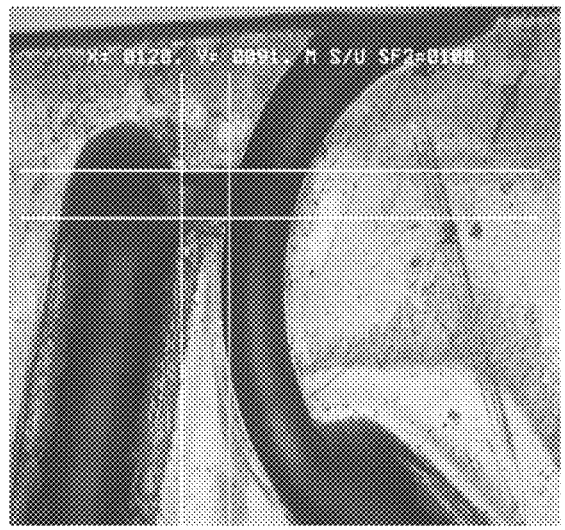
FIG. 37 illustrates another embodiment of a device with a nozzle and an exit to eject an air/fuel mixture.
Figure 42:
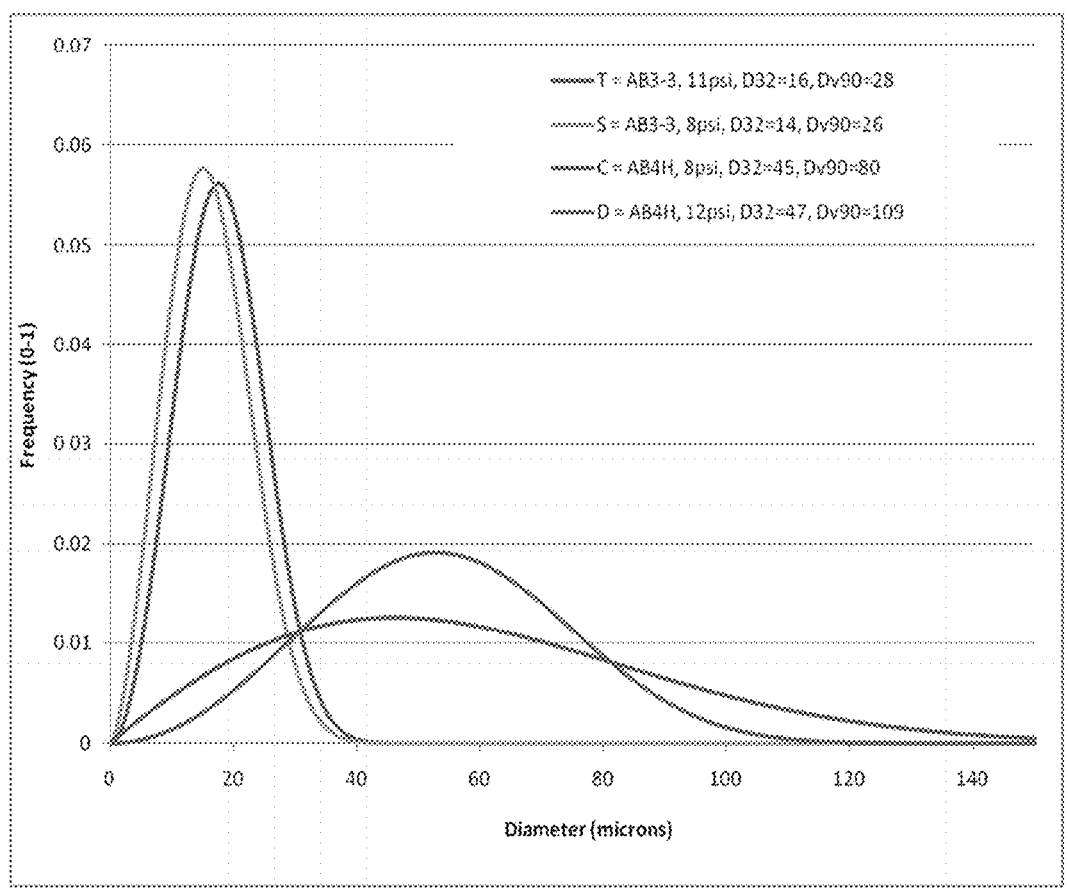
FIG. 42 is a graph comparing ejected droplet size of various embodiments of nozzles and exits.

An image of the device of Example 4 is shown in FIG. 37. Example 4 also illustrates a curved exit channel; however, Example 4 differs from Examples 1-3 in that the exit channel is oriented to be generally tangential to the plate edge. As shown in the graph shown in FIG. 42, a tangential exit can be beneficial. See, for example, a comparison on the curve of Example 1 (AB4H) with Example 4 (AB3-3), which have similar nozzle and exit dimensions.

Figure 43:
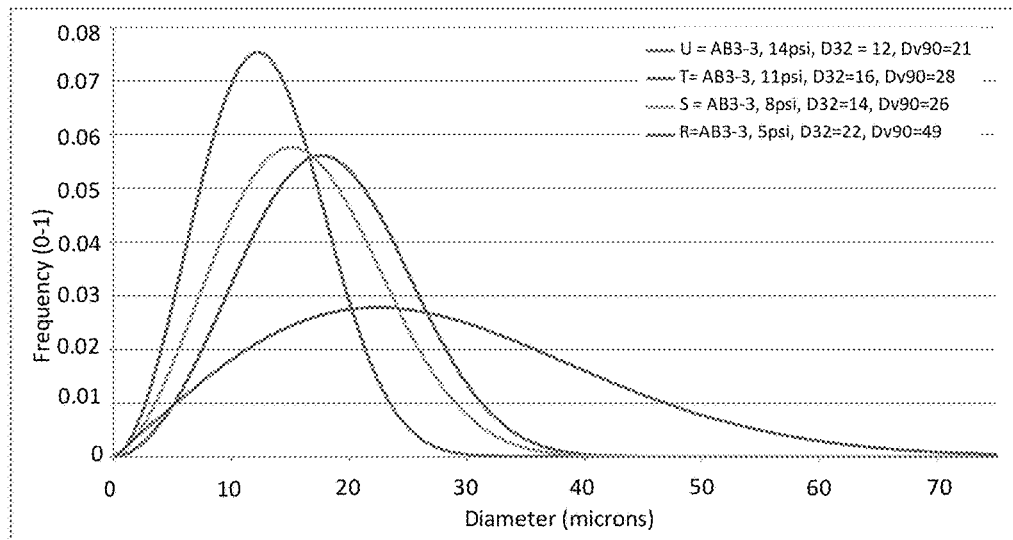
FIG. 43 is another graph comparing ejected droplet size of various embodiments of nozzles and exits.

FIG. 43 is another graph of the device of Example 4, taken over a range of pressures (e.g., 5 psi, 8 psi, 11 psi, and 14 psi). As seen in FIG. 43, droplet size decreases significantly above a pressure of 5 psi.

Figures 38, 39:
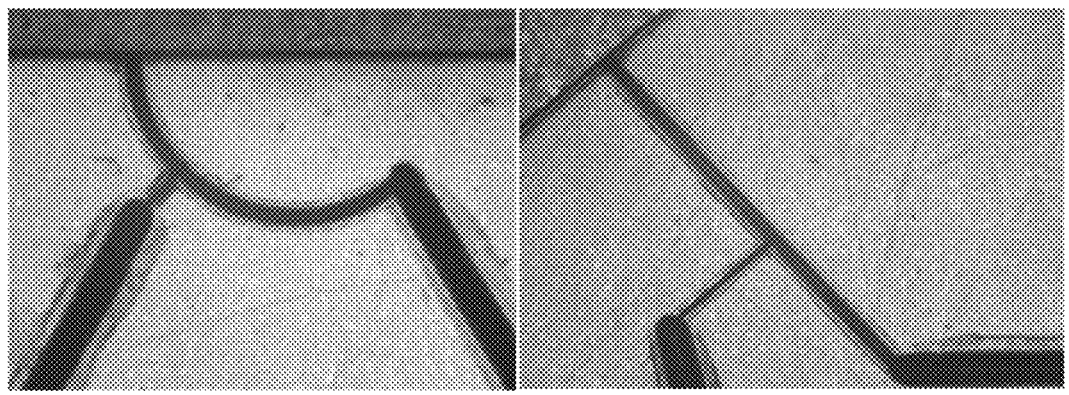
FIG. 38 illustrates another embodiment of a device with a nozzle and an exit to eject an air/fuel mixture.
FIG. 39 illustrates another embodiment of a device with a nozzle and an exit to eject an air/fuel mixture.
Figure 44:
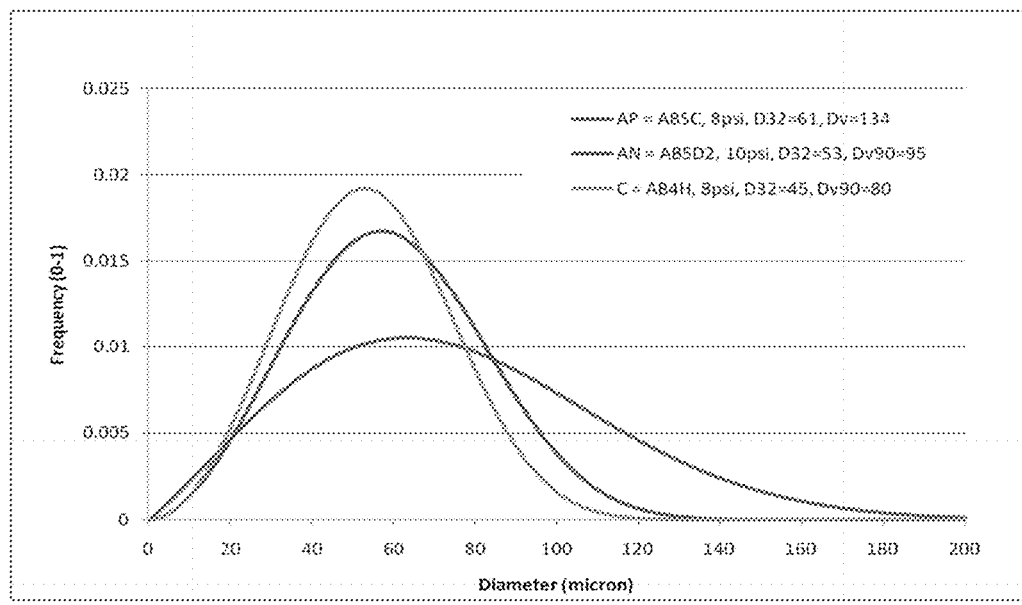

FIGS. 38 and 39 illustrate images of the devices of Examples 5 and 6, respectively. FIG. 44 is a graph showing the results of Examples 5 and 6 compared to those of Example 1.

Figures 40A, 40B:
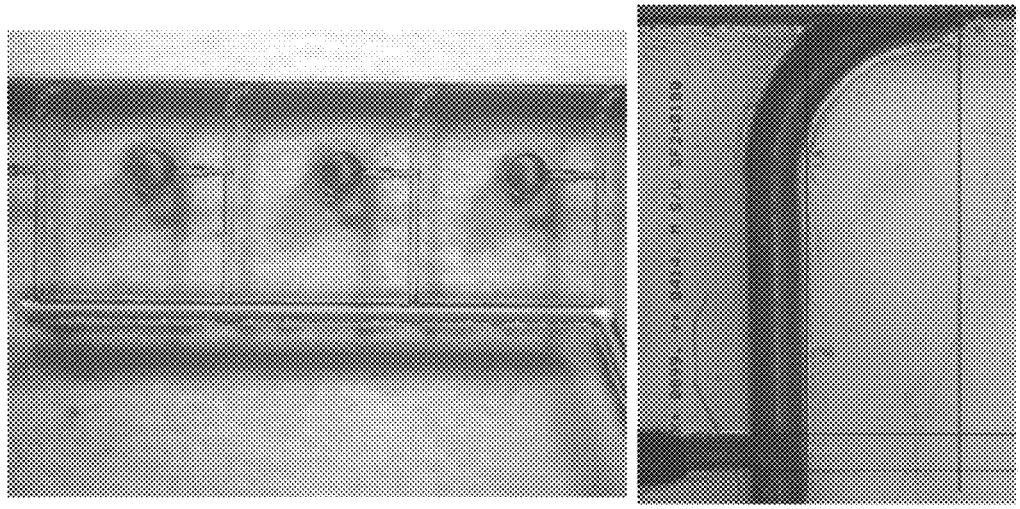
FIG. 40A illustrates an embodiment of a device with an array of nozzles and exits to eject an air/fuel mixture.
FIG. 40B is a close up view of one of the nozzles and exits of FIG. 40.

As shown in Table 1 above, two different nozzle arrays were tested. For the purposes of this test, both were constructed with 4 nozzles per plate. However, as discussed elsewhere herein, the number of nozzles can vary depending on the application. FIG. 40A illustrates an image of the nozzle array of Example 7, and FIG. 40B shows an enlarged view of a portion of one of the exit channels of Example 7.

Figure 45:
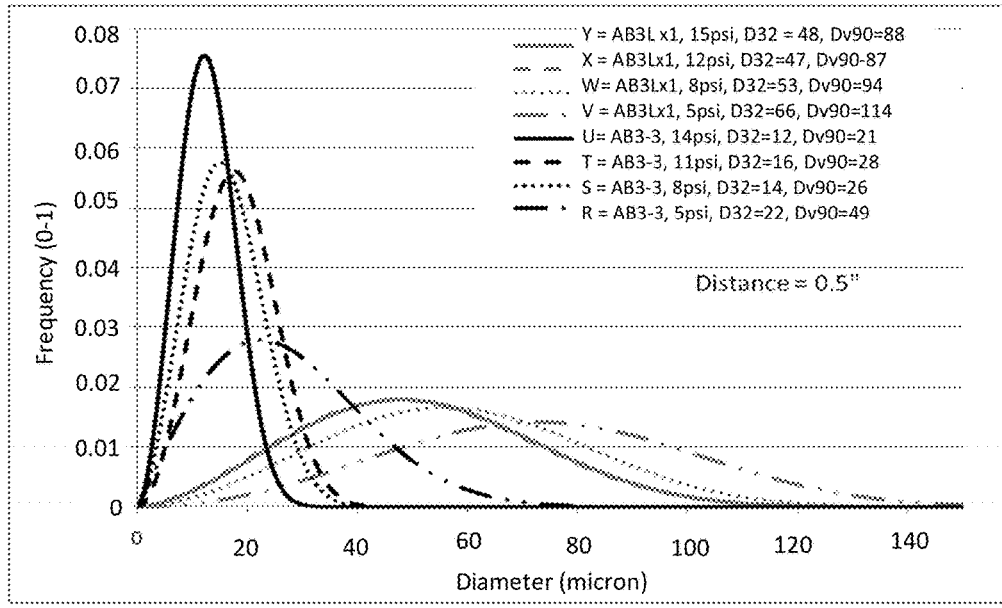
Figure 46:
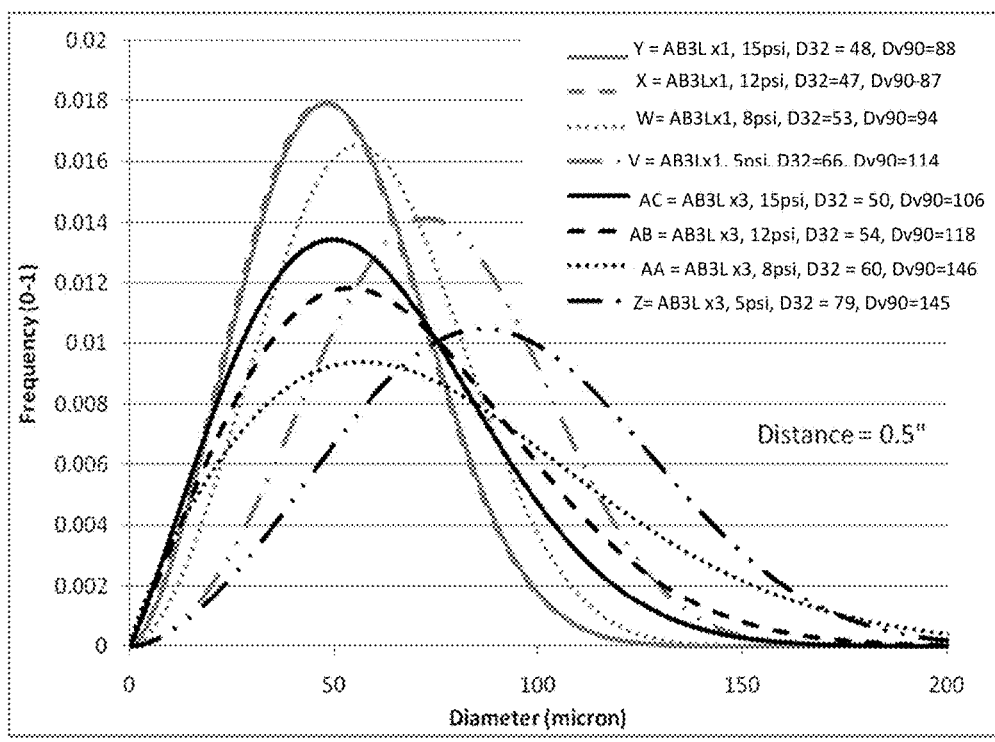

As shown in FIG. 40, Example 7 is similar to Example 4, but with a wider exit and with nozzle placement further from the exit. As shown in FIG. 45, the nozzle array of Example 7 provided significantly larger droplets than the single nozzle design of Example 4. The nozzle array for Example 7 was also arrayed by stacking three plates vertically (12 total nozzles). Accordingly, to compare single and multi-nozzle arrays more directly, FIG. 46 compares the use of one plate versus three plates. Because little difference is illustrated between the single plate and multi-plate systems in FIG. 46, the differences between droplets of Examples 4 and 7 appear to be the result of design differences in the structures rather than recombination after ejection.

Figure 47:
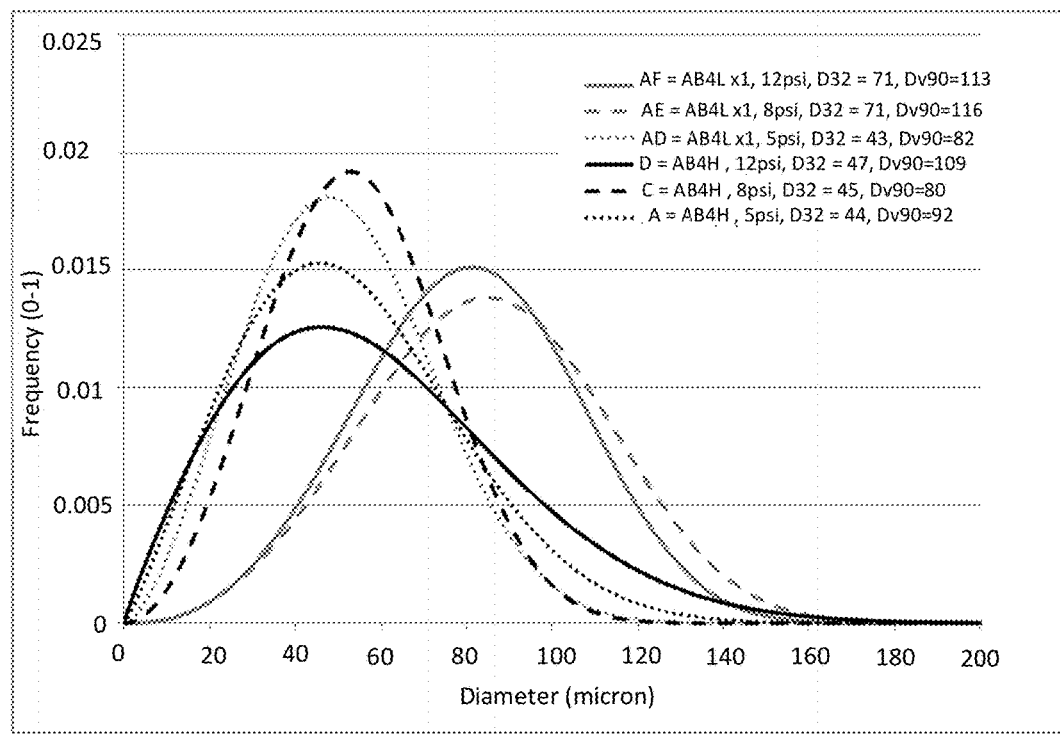

FIG. 41A illustrates an image of the nozzle array of Example 8, and FIG. 41B shows an enlarged view of a portion of one of the exit channels of Example 8. The nozzles of the nozzle array shown in FIG. 41A, but with a shorter and narrower exit and a nozzle positioned substantially closer to the exit. As in the previous example, the array generated larger droplets than the single nozzle. However, as shown in the graph of FIG. 47, the disparity was not as great.

Figure 48:
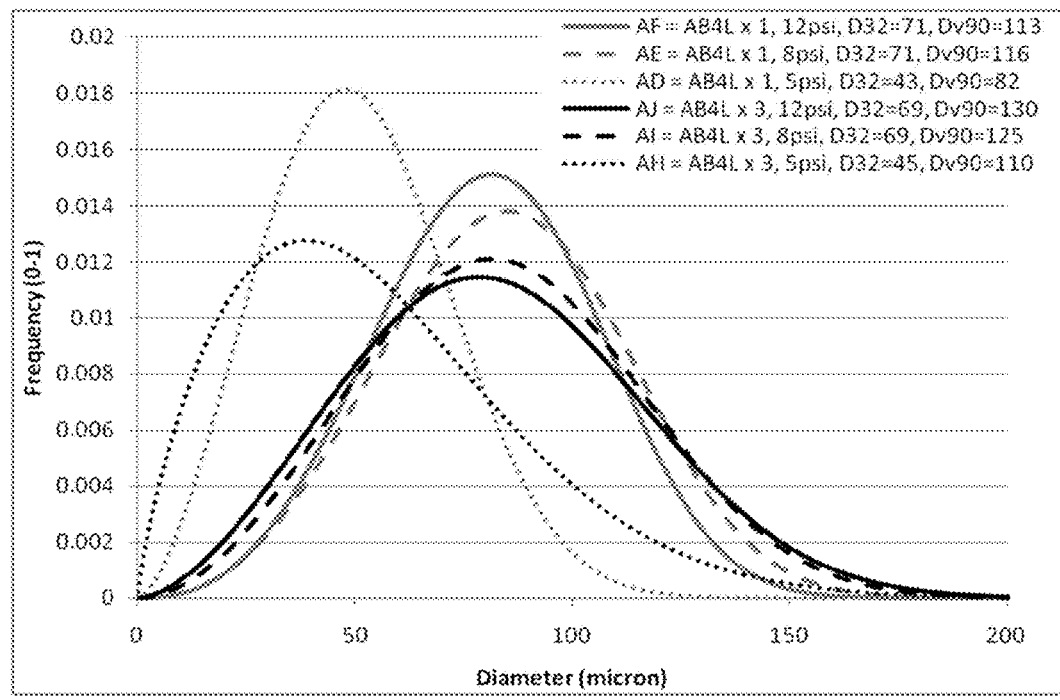

As shown in FIG. 48, a comparison of three plates stacked (12 nozzles) to the single plate (4 nozzles) shows little significant difference in the drop size. This again leads us to the conclusion that design differences between the single nozzle and the array of nozzles are the source of the of drop size differences.

Accordingly, as discussed above and as shown in the figures, droplet size is generally dependent on exit width and not on nozzle width. In addition, all other things being equal, tangential exits can result in smaller droplets than perpendicular exits.

Figure 62:
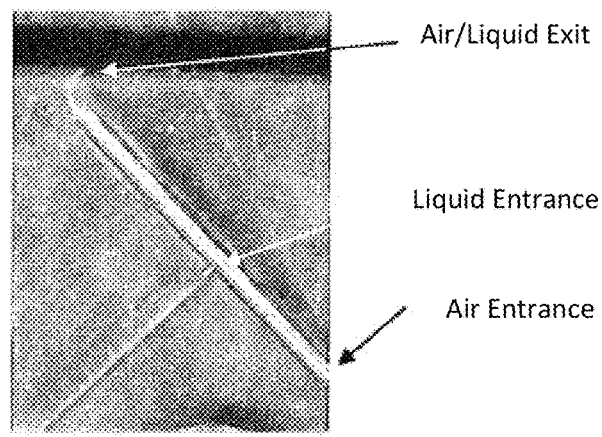

FIG. 62 illustrates another embodiment, in which a relatively smaller-sized liquid channel is used to increase the amount of air volume that passes over the surface of the liquid as it combined with the gas (e.g., air).

Figure 63:
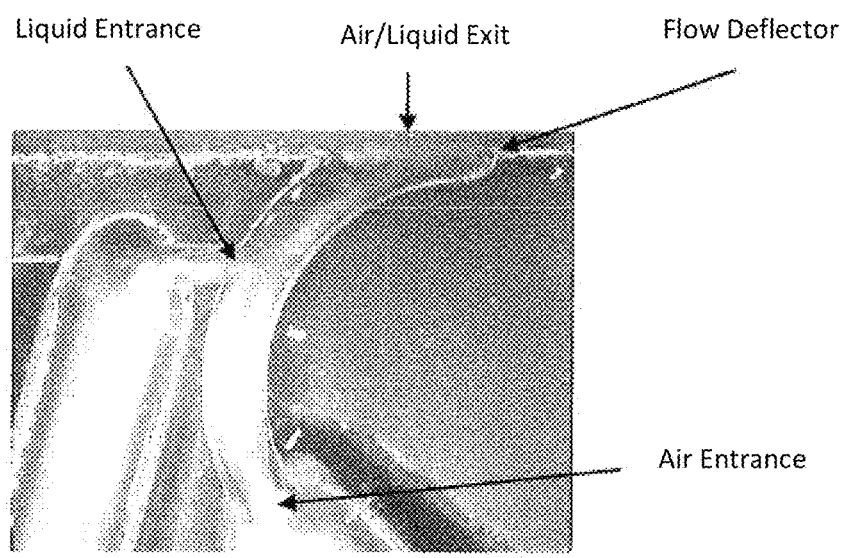

FIG. 63 illustrates another embodiment, in which the liquid entrance is at an arced or curved portion of the air channel and at a location near the nozzle exit (e.g., the combination air/liquid exit point). The air channel is both relatively narrow and short, and as a result, provides relatively high air velocity, while also providing a relatively low volume for atomizing. By positioning the liquid entrance on the outside edge of the arc or curve, increased atomization can be achieved. In addition, the nozzle exit (e.g., the combination air/liquid exit point) can be provided with a flow deflector. The flow deflector can comprise any structure that deflects flow from its current trajectory to a trajectory that is generally directed away from the edge of the device.

In one embodiment, the flow detector can be substantially perpendicular to the edge of the plate.

Figure 64:
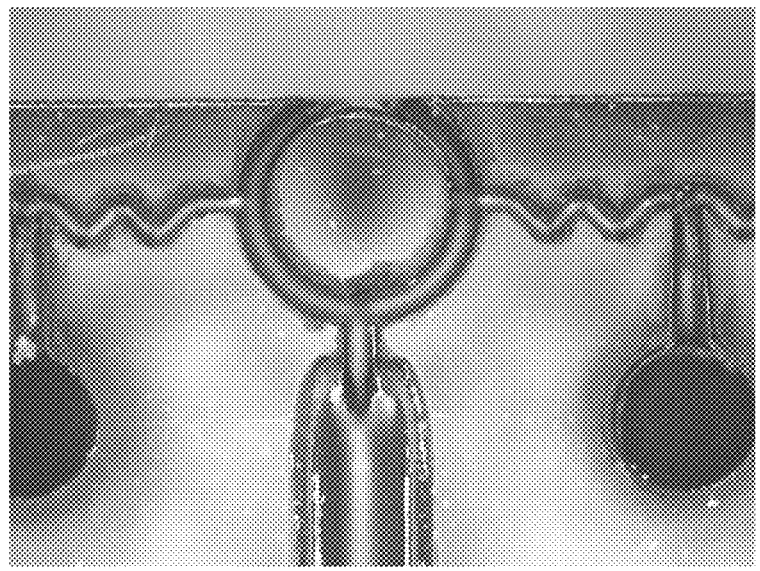
Figure 65:
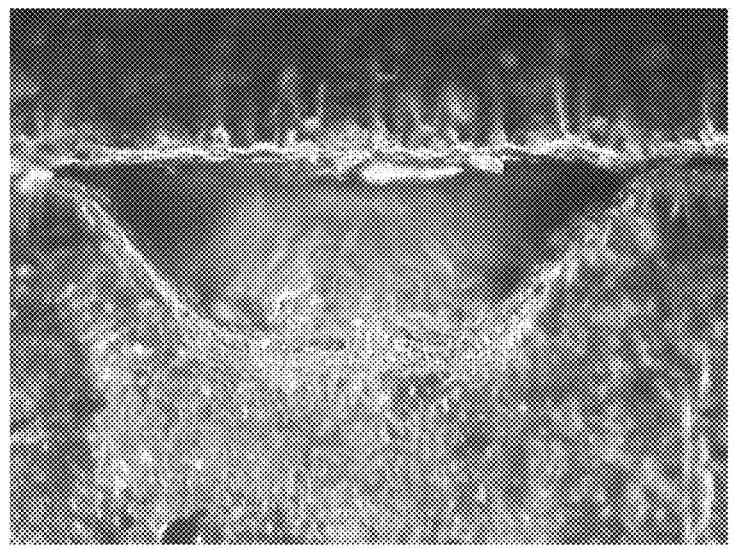
Figure 66:
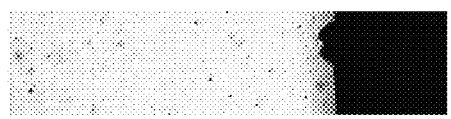

FIG. 64 illustrates an embodiment with two atomizers that have the same nozzle exit (e.g., air/liquid exit point). As shown in FIG. 64, although the two atomizes using the same nozzle exit, the delivery of air/liquid to this exit is in generally opposite directions. This opposed delivery of air/liquid in this manner not only results in atomization at the liquid-air interface at the liquid entrance for each atomizer, but also at the exit, where a second liquid-air interface is formed. FIG. 65 illustrates an edge view of the nozzle exit and FIG. 66 shows a side view of the nozzle exit, showing a second liquid-air interface of an example of the embodiment showing in FIG. 64.

FIG. 64 illustrates on liquid entrance on each side of a circular channel. For each liquid entrance, the same or a different fluid can be introduced into the respective sides of the circular channel. In addition, if the fluids are different, they can be introduced at different flow rates, if desired. In addition, more than one liquid entrance can be provided on each side of the circular channel, with such multiple liquid entrances being used to introduce the same or different fluids into respective sides of the circular channel.

As described in more detail herein, many atomizers can be combined on one plate and these plates can be stacked. This 3-D integration means that the atomizers disclosed herein can be modified to achieve different flow rates, as desired. In addition, the plates can be made from any number of materials, depending on the requirements of the application. In some embodiments, air channel dimensions range from 0.10 mm to 0.20 mm, while liquid channels range from 0.05 mm to 0.10 mm.

Figures 49A, 49B:
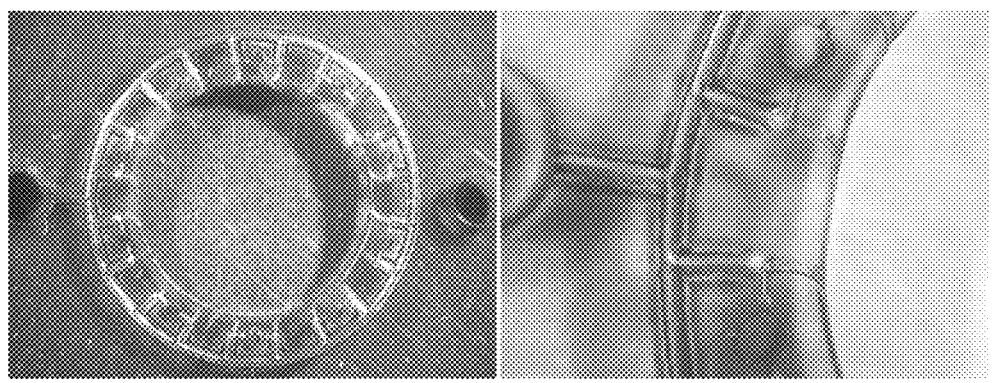
Figure 50:
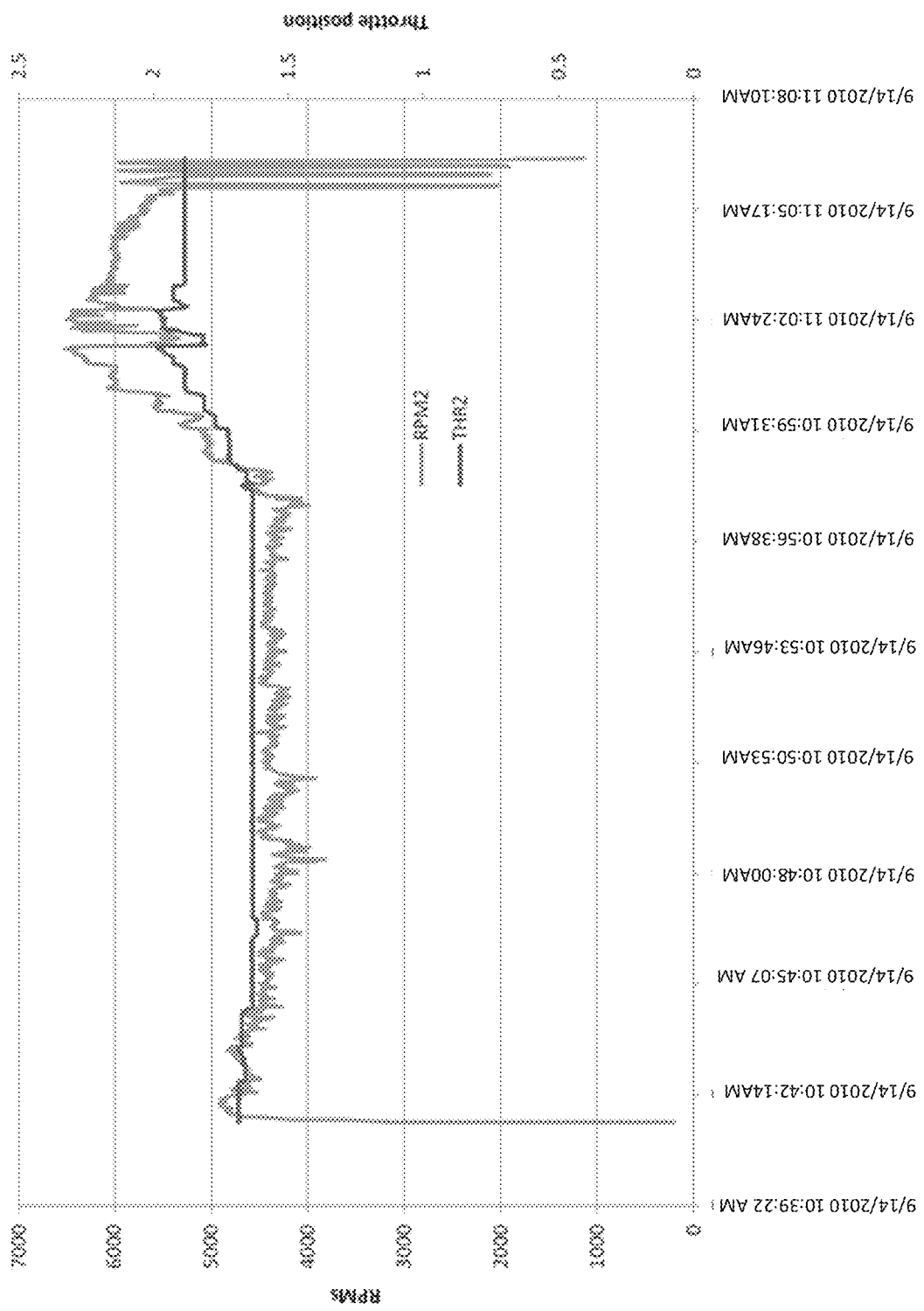
Figure 51:
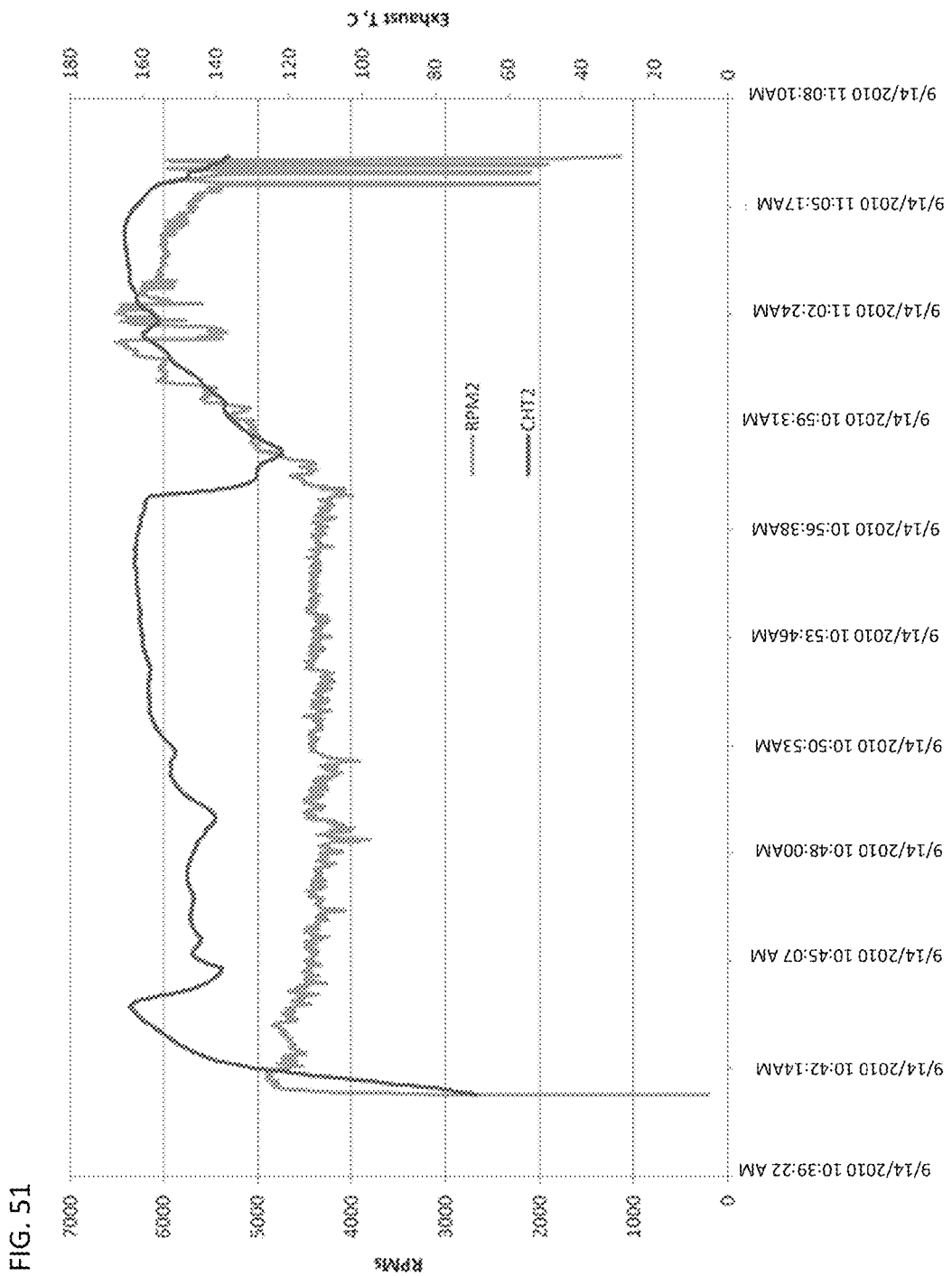

In another embodiment, a device comprising a stack of 4 nozzle plates (9 mmAB5), as shown in FIG. 49A, was provided. FIG. 49B illustrates an enlarged view of the nozzles and exit channels of the device. The device was used to provide an air/fuel mixture sufficient to run a 2 cycle engine continuously for 25 minutes. In this embodiment, each plate was provided with 20 nozzles (80 nozzles total), allowing a low pressure of 5 psi to be used to run the engine steadily between 4200-4400 rpm. After 15 minutes, the rpm were increased and ran at full throttle to test the response across various rpms. FIGS. 50 and 51 are charts that show engine revolutions per minute (RPM), exhaust temperature, and throttle position for a test run of an atomizer constructed as described herein.

In some embodiments, the pressure was increased to 20 psi to deliver adequate fuel for operation at a higher rpm. A decline in fuel efficiency was obvious as the fuel consumption dramatically rose. In some embodiments, fuel delivery through the atomizer can be controlled by modulating by the number of active nozzles rather than forcing more fuel through each.

Fluid Flow Mechanisms for the Various Embodiments

The motive force for ejecting the droplets may be from several sources, and can be a combination of sources. Constant pressure can be used, where droplet formation is through disintegration of the sheet or stream coming out of the nozzle. Pulsed pressure can be used to induce fluctuations in the meniscus in the nozzle bore, thereby creating droplet formation at the nozzle exit. The pulsed force can be induced through the header, addressing all nozzles or groups of nozzles at once, or by incorporating individual nozzle chamber pulsing sources for each nozzle as in conventional inkjet architecture.

Figure 23:
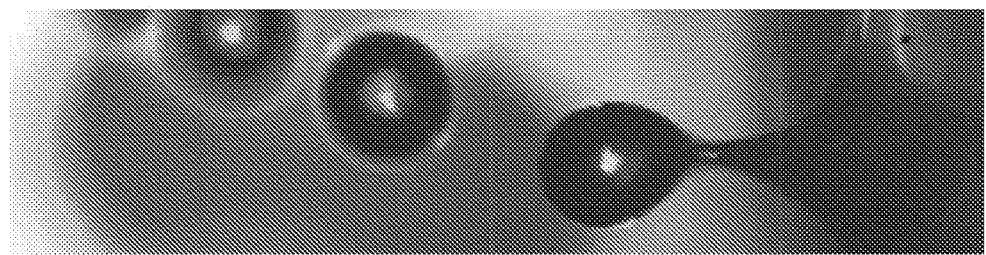
FIG. 23 is an image of discrete 300 µm diameter droplets ejected from a nozzle driven by a piezo pump operating at 300 Hz.

Applicable pulsing sources can include piezo, laser, thermal, and electrostatic, among others. A combination of forces can also be used, such as a constant pressure with a mechanical vibration imposed. The vibration can be from an engineered source, such as an ultrasonic force of specified frequency, or simply scavenged from the system, such as coupling engine vibration to the nozzle array. The image of FIG. 23 shows discrete 300 um diameter droplets ejected from a nozzle driven by a piezo pump operating at 300 Hz.

In the air/fuel systems described above, multiple systems can be used to provide the requisite pressure to drive the air and fuel through the atomizer. For example, piezo pumping of fuel can be used to precisely meter fuel through electronic control systems that are analogous to electronic fuel injection. The micronozzles can be grouped into subunits, with each subunit being addressed by separate piezo pumps. The fuel feed rate can be modulated by actuation of the piezo pumps (frequency and amplitude) as well as the number of pumps actuation.

Fuel pressure can also be provided by a diaphragm pump driven by a piston, similar to that achieved in conventional carburetor systems. Venturi forces in the air intake can be used to pull air through the micronozzles. This type of passive operation may be particularly suitable for low cost and/or low performance engines, such as, for example, applications for use with lawnmowers.

Valved Delivery of Fluids

When using low pressure sources for fuel delivery, control of fuel flow can be accomplished by activating the nozzles using valves in a binary fractal channel scheme. The number of nozzles that can be addressed is given by $2^n$, where n is the number of valves. For example, just 10 valves can address from 1 to 1024 nozzles, providing 1024 discrete flow rates. The flow rate from individual nozzles can be dependent upon the size and shape, as well as the delivery pressure. If desired, individual nozzle sizes can be vary within a device to match the need of the specific application. In some embodiments, microelectromechanical system (MEMS) valves can be integrated into the laminated design presented here, resulting in a reduced size and cost device. Such MEMS valves can include, for example, magnetic, integrated magnetic inductors, electric, piezoelectric, thermal, bistable, and combinations thereof.

Thermal Desalination Using Micronozzle Arrays

Figure 52:
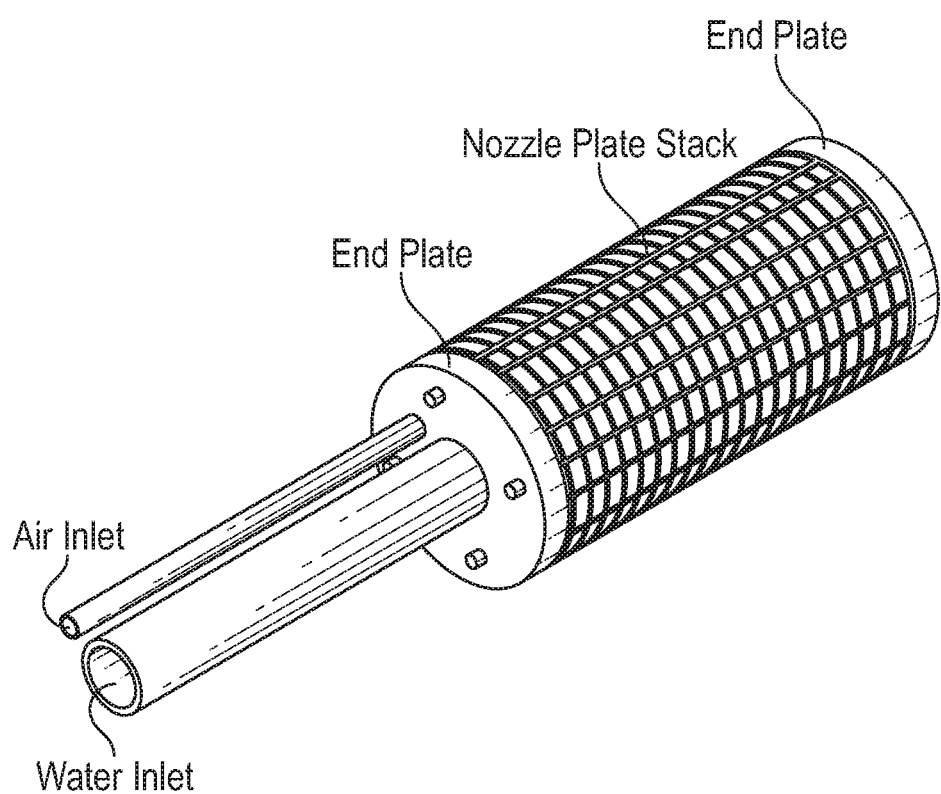

The micronozzle devices disclosed here can be used for atomization as part of thermal seawater desalination. By stacking nozzle, air, and water microchannel plates in sequence, high densities of nozzles can be achieved. For example, a stack of 1500 plates 150 mm in diameter can have 375,000 nozzles, each capable of delivering 2 ml/min of finely atomized water at low pressure (e.g., <20 psi). Such an assembly is shown in FIG. 52. As shown in FIG. 52, a nozzle plate stack can be positioned between end plates and provided in communication with one or more air and water inlets.

Figure 53:
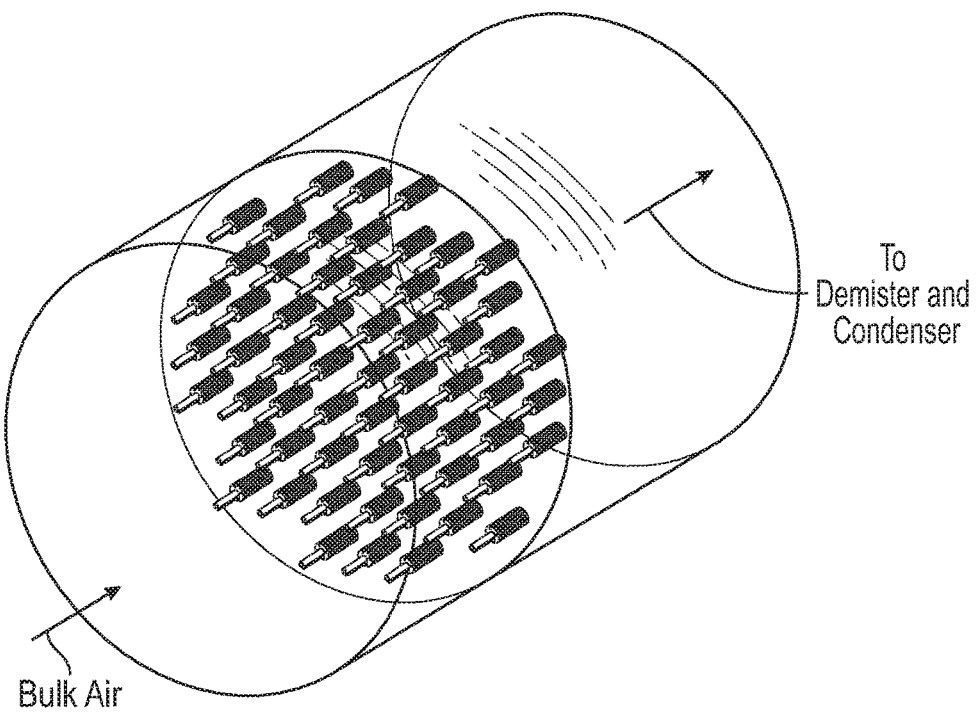

The number of nozzle plates and the number of assemblies can be varied to size the device for the necessary throughput. For example, FIG. 53 illustrates an assembly capable of more than 65,000 cubic meters per day (>17 million gallons per day). As shown in FIG. 53, sixty-one subassemblies can be provided, with each subassembly being spaced apart about 300 mm on center. In the embodiment shown in FIG. 53, the diameter of the plenum can be about 3 meters.

Figure 54:
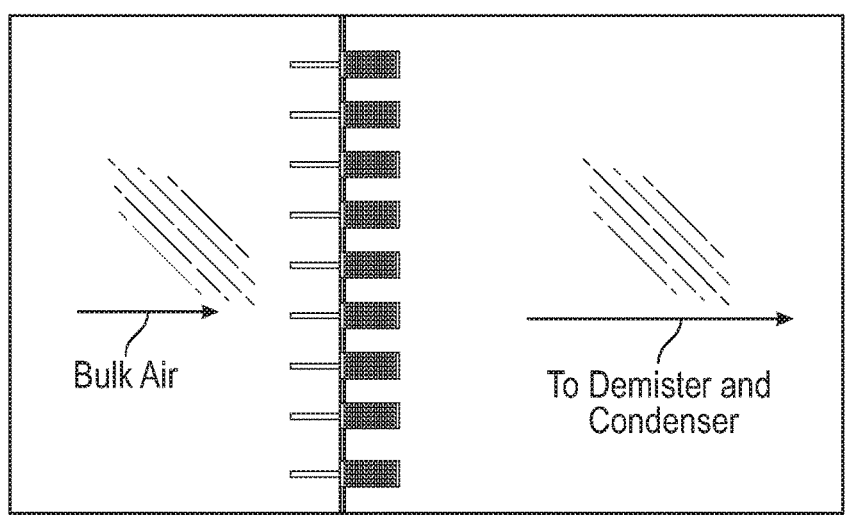

FIG. 54 further illustrates a partial view of the assembly shown in FIG. 53. As shown in FIG. 54, bulk air can be delivered to the assembly on a first side and then exit the micronozzle arrays on another side for delivery to one or more demisters and condensers.

The nozzle assemblies can be easily disassembled for cleaning and replacement. The minimum feature sizes of the nozzle are 100 micrometers or greater, making them relatively tolerant of particulates.

The micronozzle atomizers described herein can be used to replace electronic fuel injectors in automotive and other related applications. In such cases, pressure for fuel delivery can be provided by a pump and controlled by a regulating valve that returns fuel to the fuel tank. In some cases, a turbocharger can be used to drive air flow in the nozzles.

Thermal control of the device can be accomplished using integrated microchannel heat exchangers, electrical resistance heating, or thermoelectric cooling. Conventional techniques for incorporating these capabilities within the device are known to those skilled in the art. Thermal control may be necessary to heat or cool the fluid to maintain a consistent fluid viscosity, thereby controlling the droplet ejection performance.

Accordingly, as described above, the various micronozzle architectures can be formed in stacked laminae, which can provide a high density of nozzles. The micronozzle architectures can also provide low pressure drops, and can be used with low pressure pulsed droplet ejection mechanisms, such as piezo, thermal, electrostatic, acoustic, and vibrational means. The micronozzle architectures disclosed herein can have utility in a broad number of applications where liquid droplets are ejected into a bulk gas stream, including, but not limited to, fuel injection, spray drying (especially pharmaceutical production), flash evaporation and distillation, evaporation of fuel entering a combustor, and pulmonary drug delivery.

In addition to advantages resulting from high droplet delivery, the systems described herein can be very small and can be operated at low driving pressures (low energy consumption). Applied as a fuel injector, as described herein, these attributes can provide various advantages in many applications for fuel delivery. For example, in unmanned aerial vehicles (UAVs), pump size and power consumption make conventional high pressure fuel injectors unsuitable for use. As another example, the devices disclosed herein can be advantageously used in pharmaceutical spray drying, where the systems described herein can provide tighter distributions of droplet sizes, thereby improving product quality.

Micronozzle Airblast Atomizers—Additional Embodiments

Figure 55:
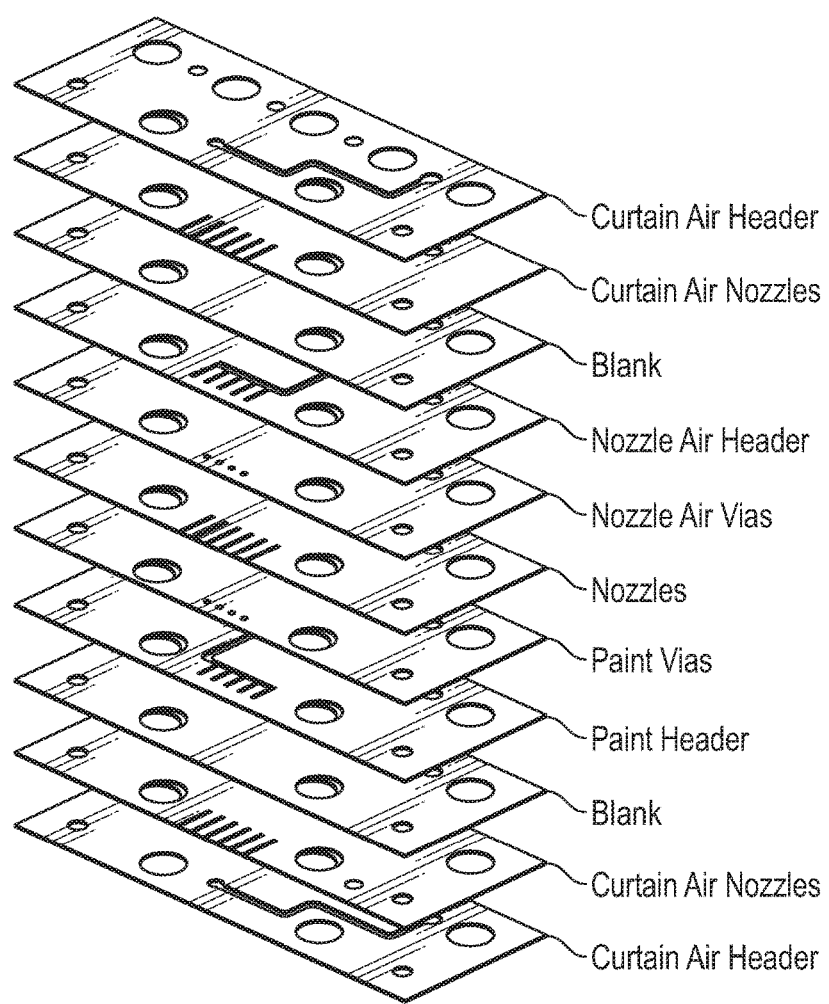
Figure 56:
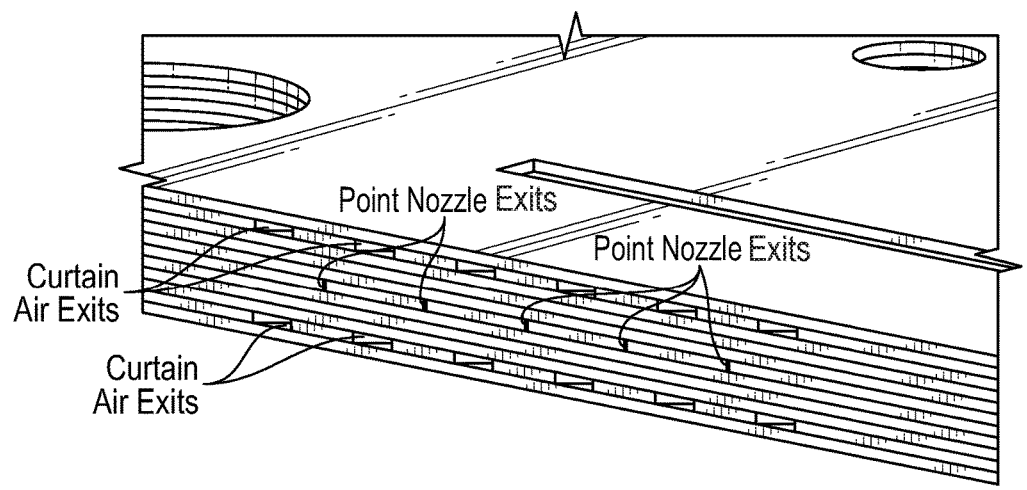

FIGS. 55 and 56 illustrate views of micronozzle airblast atomizers that can be used in various applications relating to fluid deposition processes. For example, such configurations can be used in various applications that use air or other gases to atomize a material and direct the atomized particles of the material out of a nozzle onto a surface. Such applications can include, for example, the preparation and/or delivery of coatings or paint materials. In some embodiments, the atomizer can be configured to atomize particles for spray painting a surface.

As shown in FIG. 55, a micronozzle atomizer can be constructed using a layered architecture, such as a laminated or "sheet" architecture. The layered architecture can comprise a plurality of stacked pattern layers that are designed to eject fluid droplets out of the device using an air blast configuration. As described herein, the atomizer can be configured to deliver small droplets in a narrow size dispersion.

As shown in FIG. 56, the air blast configuration can cause air and fluid (e.g., paint) streams to be mixed as they are ejected from nozzles. As discussed herein, the atomizer can be configured to mix the fluid components (e.g., paint and air, or an inert or reactive gas, forming an atomized spray) during ejection by the nozzles and/or prior to ejection of the mixed components by the nozzles.

The atomizer can also have a means to assist and confine droplet delivery integrated into the atomizer structure. For example, curtain air exits can be integrated into the design to confine small droplets and carry them along a boundary layer defined by the curtain air to a surface. The curtain air flow can be adjusted independently from the atomizer air and fluid flows.

In other embodiments, the two fluids to be mixed can be a first fluid that comprises thinfilm precursor chemistries and the second fluid can comprise an inert or reactive gas.

FIGS. 55 and 56 illustrate layered arrangements that include, for example, a pair of curtain air headers and curtain air nozzles at opposing sides of the atomizer to help control flow of the material (e.g., paint) as it is delivered out the nozzle exits. As shown in FIG. 56, paint nozzle exits can be located between the curtain air exits at the opposing sides of the atomizer. In one embodiment, the nozzle exits can be centrally located relative to the curtain air exits. In addition, one or more blanks can be provided between the curtain air nozzles to provide a desired spacing from the main nozzles.

Although FIGS. 55 and 56 illustrate a particular number and configuration of nozzles, it should be understood that the number and configuration of nozzles can be selected to achieve desired spray characteristics, including droplet size and plume shape. In addition, the devices described herein can comprise multiple micronozzles and can be operated in parallel, activated all at once, in subgroups, or individually.

Such atomizers can be particularly useful in spray painting or spray coating operations because the device can be manufactured relatively inexpensively and can be operated effectively at low delivery pressures. In addition, parallel operation can enable the creation of large "spray bars" that can coat large surface areas in a single pass. Also, because integrated mixers such as those described herein, can mix reactive components just prior to ejection, the integrated mixers can enable new coating and/or painting processes using fast reacting components.

Figure 57:
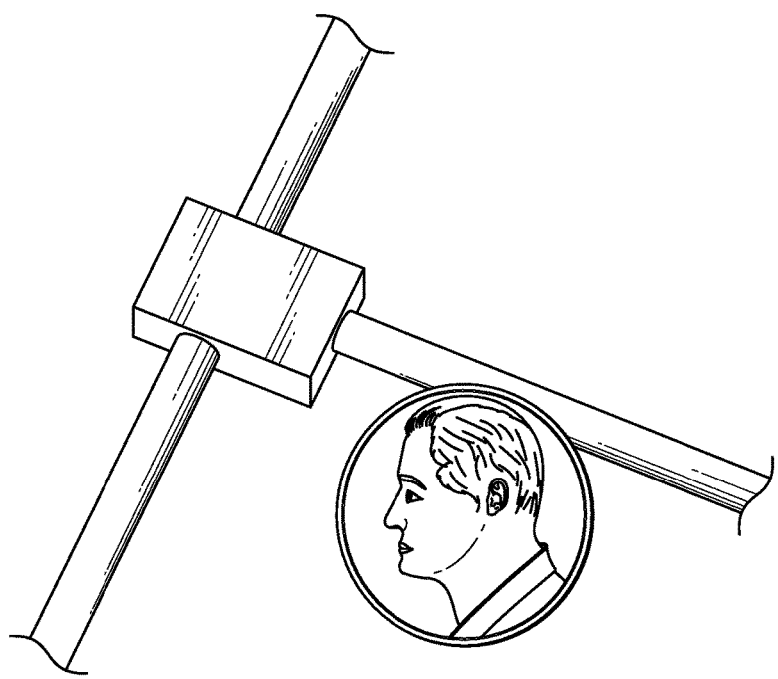

FIG. 57 illustrates an embodiment of a fluid micromixer using the micronozzle atomizer architecture described herein. This structure can enable point-of-use mixing of multicomponent fluids by providing multiple fluid inlets integrated into the micronozzle atomizer architecture. For example, FIG. 57 illustrates an 11-layer spray painting atomizer similar to that shown in FIG. 55 with a pair of fluid inlets extending from the "T" junction of the micromixer. If desired, the micromixer shown in FIG. 57 can efficiently mix viscous fluids in disproportionate ratios, e.g., 4:1 color to activator mixing of acrylic urethane paints.

Figure 58:
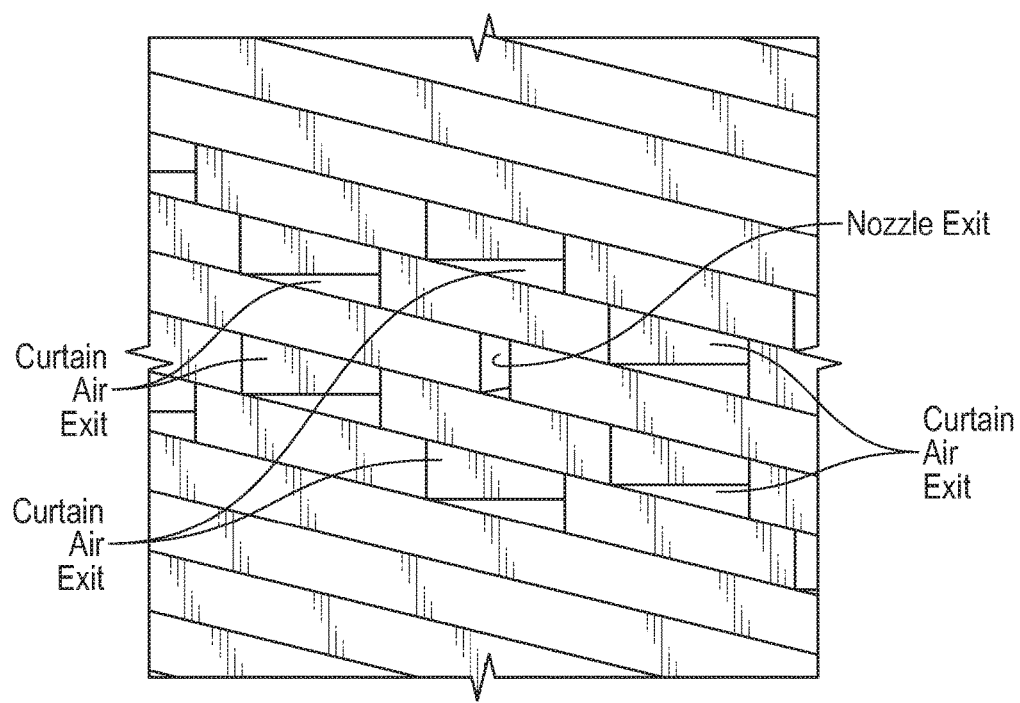
Figure 67A:
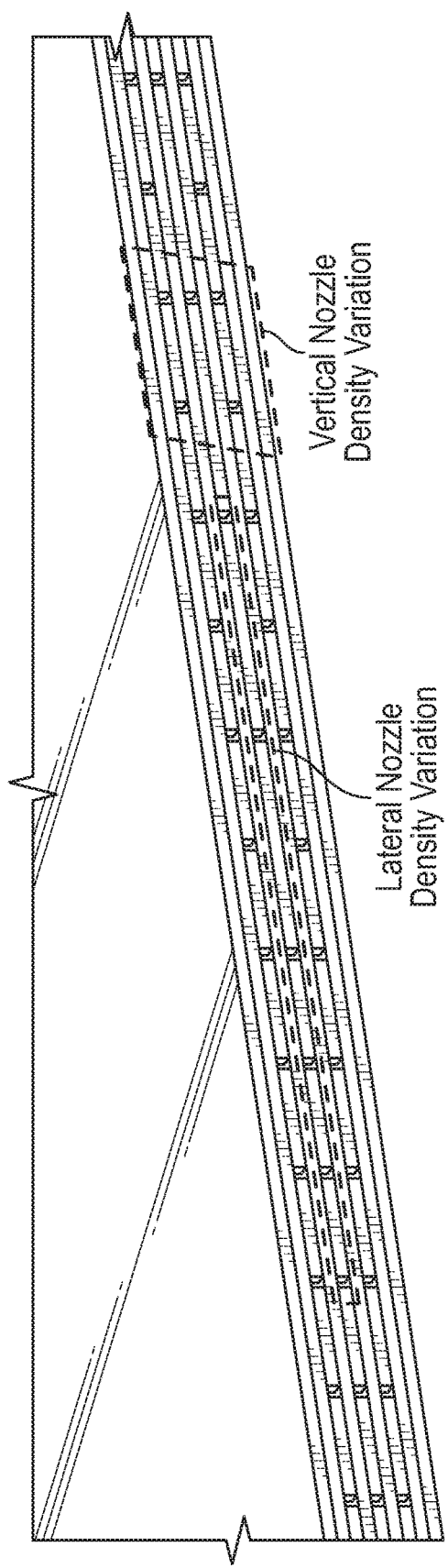

The curtain nozzles described herein can be positioned above, below, in between the nozzle exits, including some combination of all three positions. For example, FIG. 58 illustrates an embodiment where a nozzle exit is generally surrounded by a plurality of curtain-gas air exits. In addition to the relative location of curtain nozzles, it should be understood that the nozzle exits in general (both for mixed fluids and for curtain gas delivery) can be varied throughout the edge or other area where the fluids exit. For example, as shown in FIG. 67A, nozzle density can vary laterally or vertically.

Figure 67B:
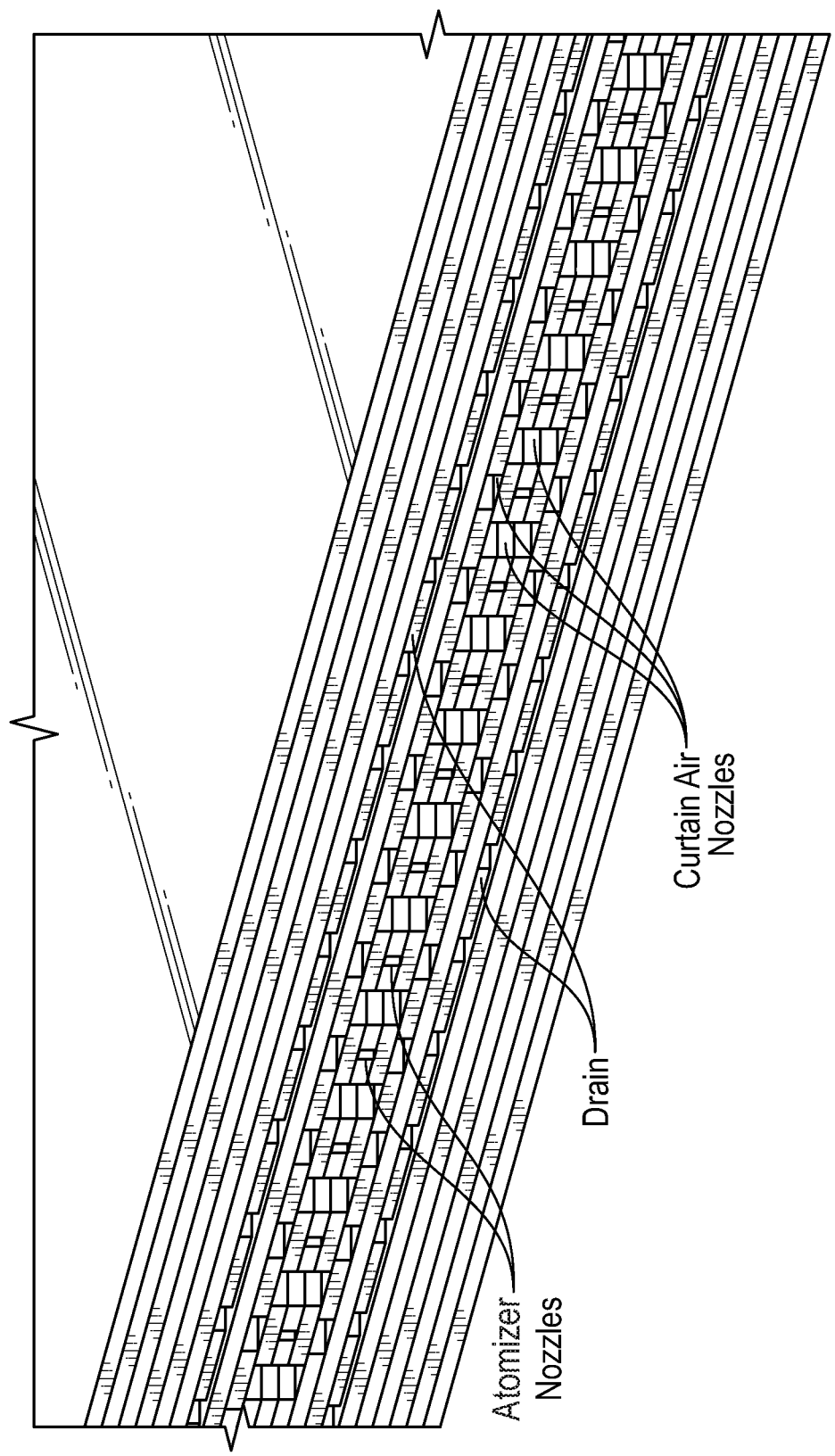

FIG. 67B illustrates another embodiment of a device that includes at least one drain. The drain can comprise an aspirated channel that functions to remove fluid that may have collected on the surface perpendicular to the spray.

Also, although the nozzle exits described herein for fluids (including curtain gas delivery) are generally shown with a slot-like configuration (e.g., a generally rectangular shape), other shapes for nozzle exits can be used and, at least in some applications, such shapes may have certain advantages over the slot-like opening illustrated in the figures.

Parameter Sensing

In some embodiments, systems can be provided for sensing various parameters in the devices disclosed herein. These sensing systems can be implemented on laminates that can then be integrated with microchannel, valve, and/or control system layers. Such sensing systems can be used to determine various parameters in situ, including, for example, temperature, pressure, and/or flow rates in stacked laminate microchannel systems.

Figure 68:
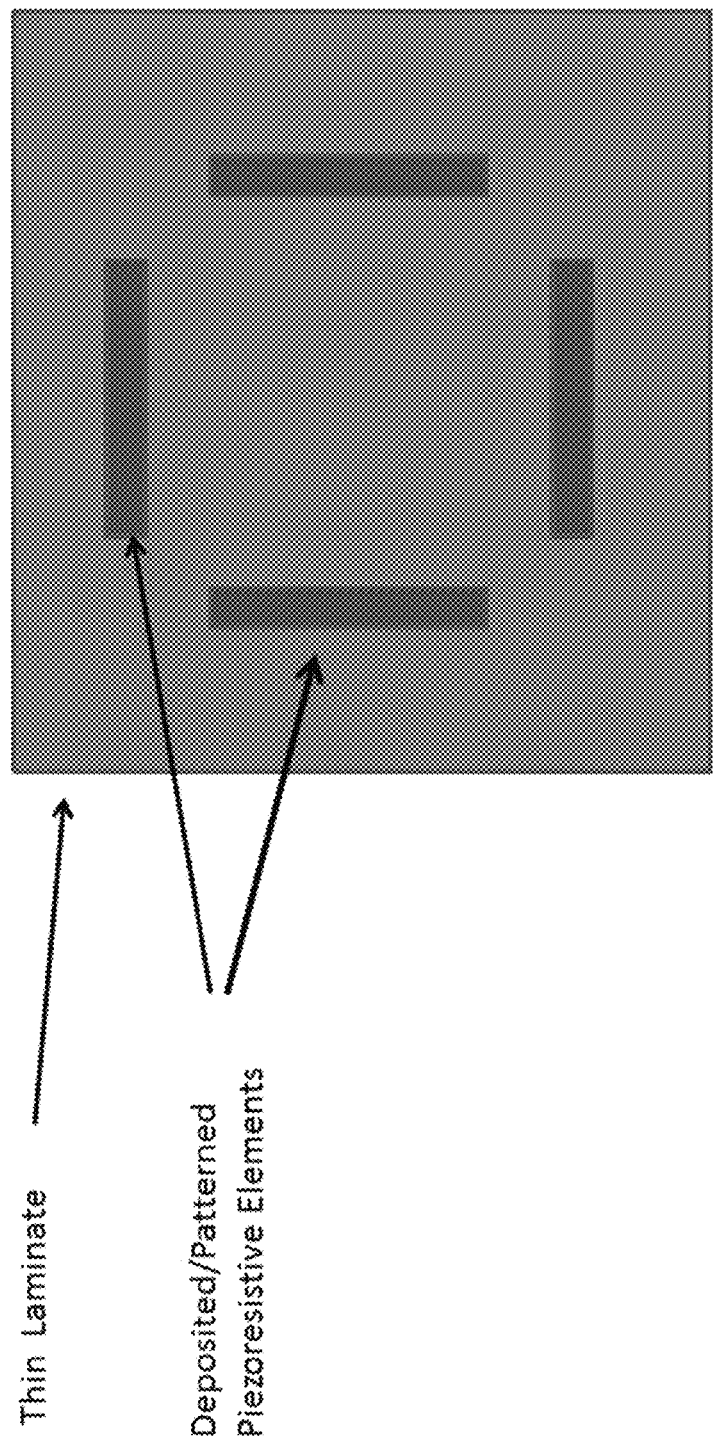

FIG. 68 illustrates a pressure sensor that can be formed on a thin laminate for use in the laminated architectures described herein. The thin laminate can comprise one or more pressure sensing devices, such as deposited or patterned piezoresistive elements. Using such microelectromechanical systems (MEMs), deflections of the thin laminate will cause a change in the resistance of the sensing device, which in turn can be used to obtain pressure measurements.

Figure 69:
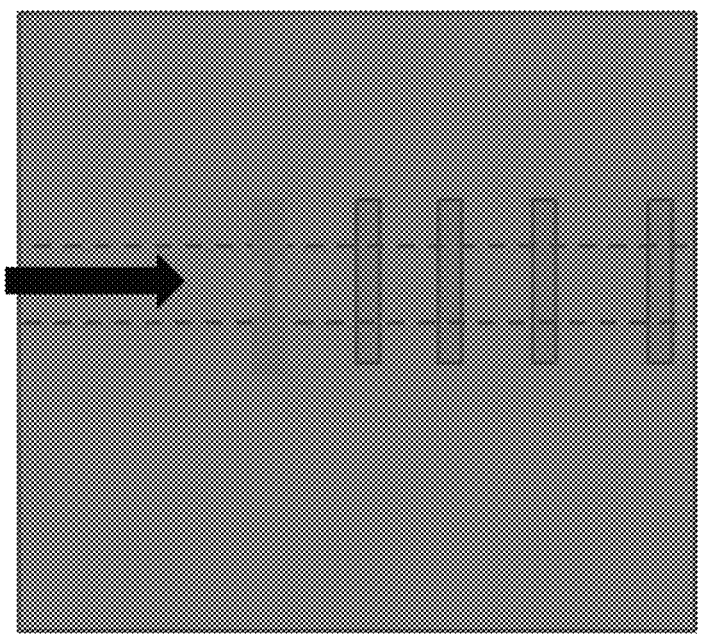

FIG. 69 illustrates a flow sensing device that can be formed on a laminate. In this example, gold or platinum traces can be formed on a thin laminate. These traces can be used to heat fluid and the resistance of other traces can be used to indicate fluid flow in a designated area.

Figure 70:
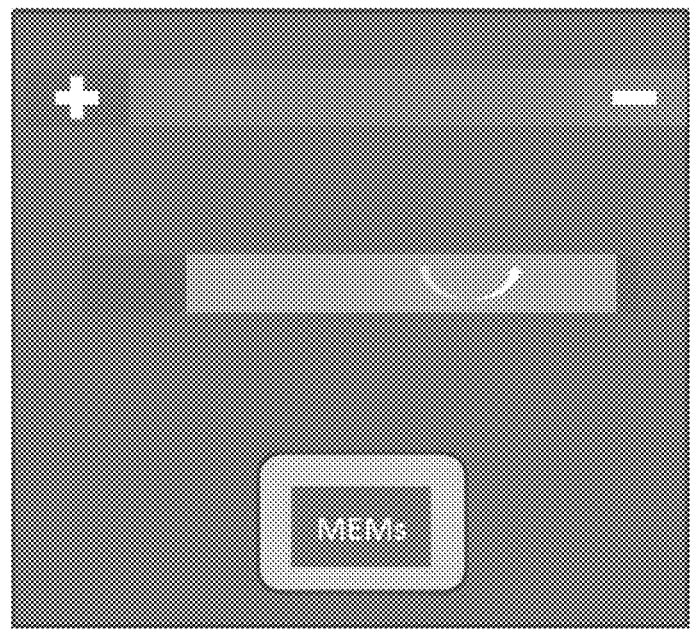

FIG. 70 illustrates a temperature sensing device that can be formed on a laminate. Such temperature sensing devices can include, for example, thin film thermocouples that comprise dissimilar metals deposited/patterned on a thin film laminate. Thermocouple voltages can be used to indicate temperature. In other embodiments, the sensing device can comprise one or more thin film bimetal strips on which dissimilar metals are deposited/patterned. Mechanical forces along the bimetal strip can be measured to indicate temperatures. In another embodiment, the sensing device can comprise one or more sealed cavity thermometers that contain a fluid sealed in a cavity that is capped with a pressure sensor that can indicate temperature.

Figure 71:
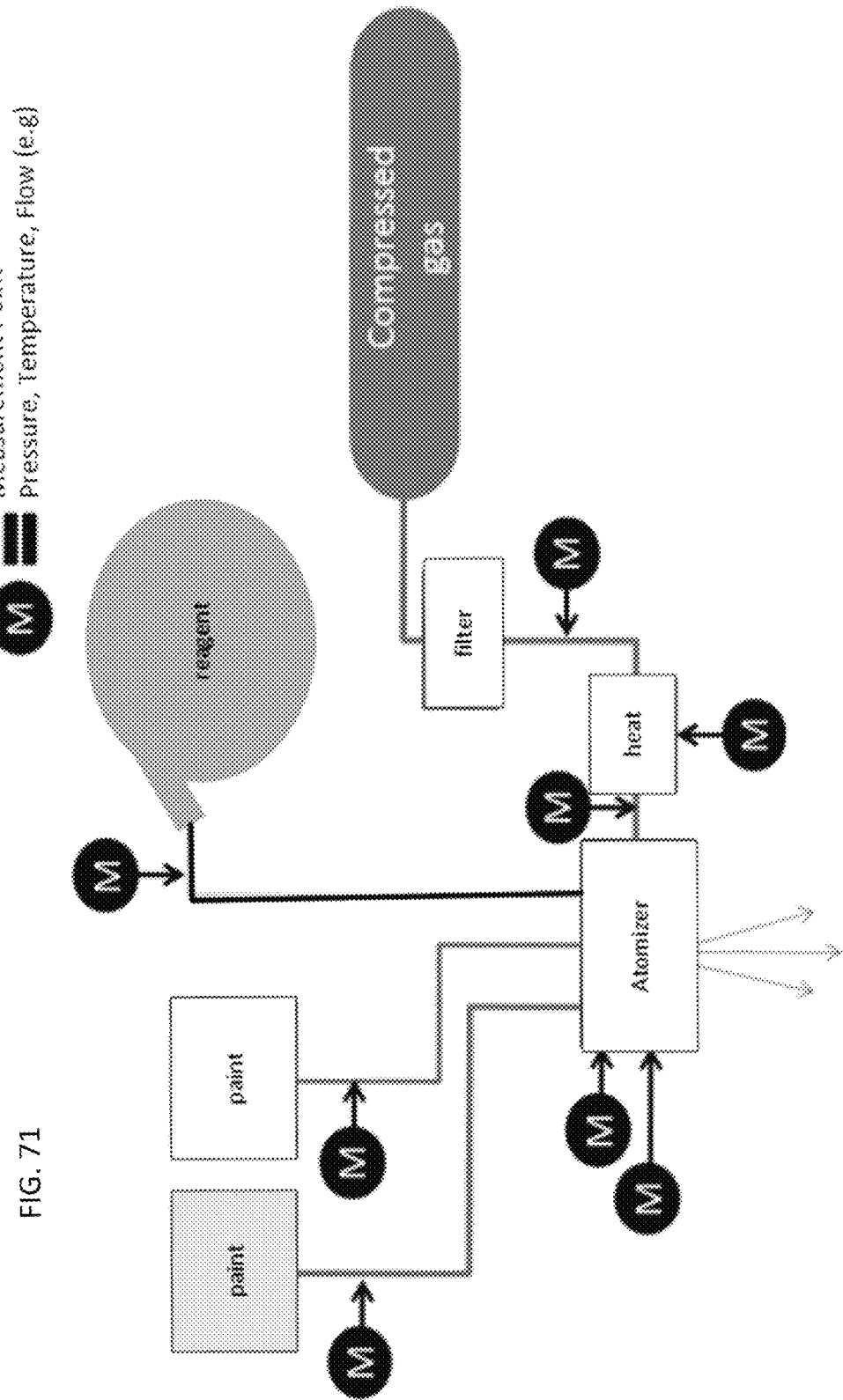

FIG. 71 illustrates an example of an atomizer system with multiple inputs and process control measurement points. As shown in FIG. 71, two different fluids (e.g., two different types of paint) can be atomized in combination with a reagent. Various measurement points (M) can be provided to take measurements of pressure, temperature, flow, and other variables during operation of the atomizer system.

Figure 72:
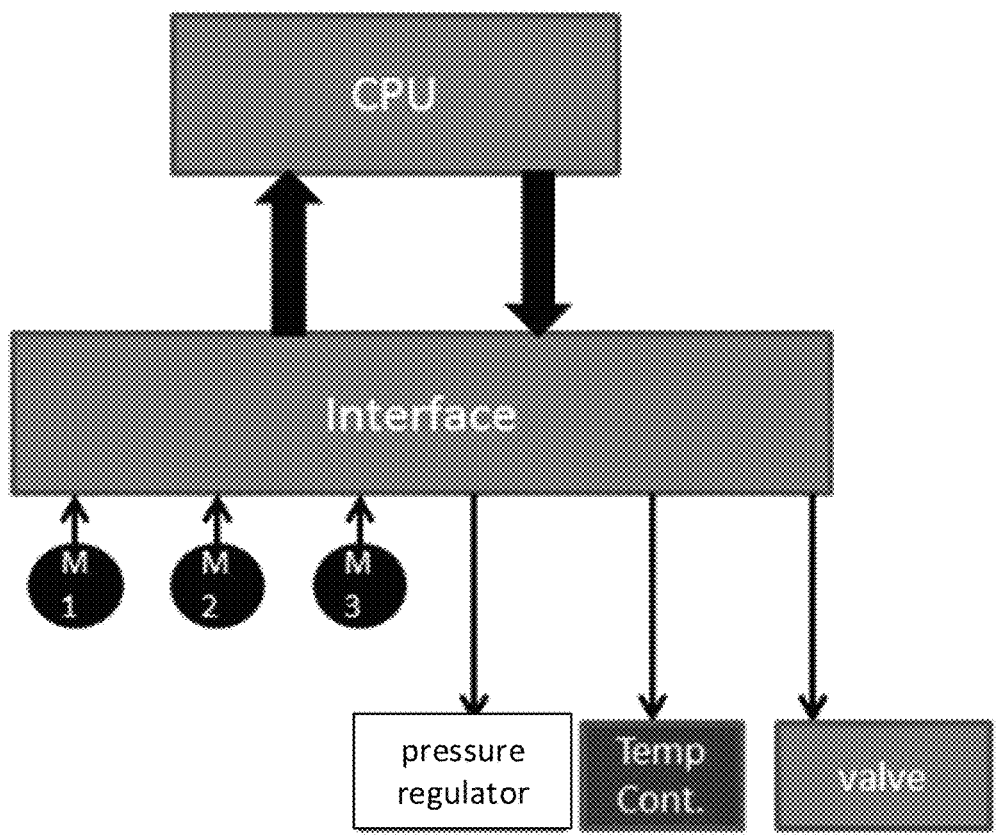

FIG. 72 illustrates an exemplary system for obtaining measurement inputs and altering the operation of the system based on the feedback obtained from the measurement inputs. For example, pressure, temperature, and flow measurements can be taken and, as a result of this measurement information (e.g., signals provided to the CPU reflecting this measurement information), the system can adjusted the pressure (e.g., via a pressure regulator), temperature (e.g., via a temperature control), and/or flow (e.g., via a valve) of the system.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A micronozzle device for delivering a plurality of fluids, comprising:
   at least one layer comprising a plurality of nozzle exits delivering a mixture comprising a first fluid and a second fluid;
   at least one first-fluid header layer having a plurality of first microchannels receiving the first fluid;
   at least one first-fluid via layer adjacent the at least one first-fluid header layer to receive the first fluid and direct the first fluid to the plurality of nozzle exits;
   at least one second-fluid header layer having a plurality of second microchannels receiving the second fluid;
   at least one second-fluid via layer adjacent the at least one second-fluid header layer to receive the second fluid and direct the second fluid to the plurality of nozzle exits;
   a plurality of curtain-gas nozzles including a plurality of first curtain-gas nozzles located at a first side of the at least one layer comprising the plurality of nozzle exits and a plurality of second curtain-gas nozzles located at a second side of the at least one layer comprising the plurality of nozzle exits, the plurality of first and second curtain-gas nozzles being sized to deliver air therethrough to define boundary layers that restrict the flow of the mixture of the first and second fluids after exiting the plurality of nozzle exits; and
   wherein, the micronozzle device comprises an alternating arrangement in which the plurality of nozzle exits are positioned between the plurality of first curtain-gas nozzles and the plurality of second-curtain gas layers.

2. The micronozzle device of claim 1, wherein the first fluid comprises a paint, coating, or thinfilm precursor chemistries and the second fluid comprises a gas.

3. The micronozzle device of claim 1, further comprising at least one blank layer positioned between a layer containing the first curtain-gas nozzles and an adjacent layer.

4. The micronozzle device of claim 1, wherein the curtain-gas nozzles are positioned above, below, or in between the plurality of nozzle exits.

5. The micronozzle device of claim 1, comprising alternating layers of first-fluid header and the at least one first-fluid via layer and second-fluid header and the at least one second-fluid via layer.

6. The micronozzle device of claim 5, wherein the at least one first-fluid via layer and the at least one second-fluid via layer are adjacent a layer having at least a portion of the plurality of nozzle exits, with the vias in the first-fluid via layers and second-fluid via layers being positioned so that the first and second fluids are mixed before being ejected from the plurality of nozzles.

7. The micronozzle device of claim 1, wherein at least some of the nozzles exits are oriented to direct the mixture substantially perpendicularly to an edge of the layer on which the plurality of nozzle exits are located.

8. The micronozzle device of claim 1, wherein the first fluid and the second fluid are combined sequentially.

9. The micronozzle device of claim 1, wherein the plurality of nozzle exits are configured such that fluid droplets delivered from the plurality of nozzle exits combine when deposited on a surface.

10. The micronozzle device of claim 1, wherein flow of combinations of the first fluid and the second fluid exiting the plurality of nozzle exits can be modulated, including complete stoppage, thereby controlling the composition of the resulting spray or deposited film.

11. The microchannel device of claim 1, wherein at least some of the plurality of nozzle exits in the microchannel device are of different sizes from one another.

12. The microchannel device of claim 1, wherein the spacing of the exit nozzles, both laterally and vertically, can be nonuniform to effect desired spray or deposited film patterns.

13. The microchannel device of claim 1, wherein the plurality of nozzle exits are oriented such that the resulting spray is nonperpendicular to the edge of the layer, thereby effecting a desired spray of deposited film patterns.

14. The microchannel device of claim 1, wherein delivery of the plurality of fluids to the fluid inlets is accomplished by various modes, including constant, variable, and pulsed flows.

15. The microchannel device of claim 1, wherein the nozzle exit face is nonlinear, thereby effecting a uniform spray on a deposition surface.

16. The microchannel device of claim 1, further comprising at least one drain, the drain comprising an aspirated channel to remove excess fluid that collects on the device.

17. The micronozzle device of claim 1, wherein the first fluid and the second fluid supplied at disproportionate ratios.

* * * * *